United States Patent
Zhang et al.

(10) Patent No.: US 10,708,143 B2
(45) Date of Patent: Jul. 7, 2020

(54) METHOD AND APPARATUS FOR THE SPECIFICATION OF A NETWORK SLICE INSTANCE AND UNDERLYING INFORMATION MODEL

(71) Applicants: Hang Zhang, Nepean (CA); Nimal Gamini Senarath, Ottawa (CA); Chengchao Liang, Ottawa (CA); Remziye Irem Bor-Yaliniz, Ottawa (CA)

(72) Inventors: Hang Zhang, Nepean (CA); Nimal Gamini Senarath, Ottawa (CA); Chengchao Liang, Ottawa (CA); Remziye Irem Bor-Yaliniz, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/186,266

(22) Filed: Nov. 9, 2018

(65) Prior Publication Data
US 2019/0158364 A1 May 23, 2019

Related U.S. Application Data

(60) Provisional application No. 62/588,183, filed on Nov. 17, 2017, provisional application No. 62/588,216, filed on Nov. 17, 2017.

(51) Int. Cl.
H04L 12/24 (2006.01)
H04W 4/50 (2018.01)
G06F 9/455 (2018.01)

(52) U.S. Cl.
CPC ............ *H04L 41/145* (2013.01); *G06F 9/455* (2013.01); *H04L 41/12* (2013.01); *H04L 41/5045* (2013.01); *H04L 41/5054* (2013.01); *H04W 4/50* (2018.02); *H04L 41/5096* (2013.01)

(58) Field of Classification Search
CPC ... H04L 41/145; H04L 41/12; H04L 41/5045; H04L 41/5054; H04L 41/5096; H04W 4/50; G06F 9/455
See application file for complete search history.

(56) References Cited

U.S. PATENT DOCUMENTS

| | | | |
|---|---|---|---|
| 2018/0176858 A1* | 6/2018 | Wang | H04W 76/11 |
| 2019/0124671 A1* | 4/2019 | Starsinic | H04W 4/70 |
| 2020/0053802 A1* | 2/2020 | Li | H04L 41/5041 |

FOREIGN PATENT DOCUMENTS

| | | |
|---|---|---|
| CN | 106341832 A | 1/2017 |
| CN | 106657194 A | 5/2017 |
| WO | 2016192636 A1 | 12/2016 |

(Continued)

OTHER PUBLICATIONS

Qiang, et al. "Technology Independent Information Model for Network Slicing; draft-qiang-coms-netslicing-information-model-00"; IETF, Sep. 25, 2017.

(Continued)

*Primary Examiner* — Khai M Nguyen

(57) ABSTRACT

A method comprises communicating a specification of a network slice instance (NSI) that identifies a network function (NF), and operating the identified NF in accordance with the specification.

22 Claims, 36 Drawing Sheets

(56) References Cited

FOREIGN PATENT DOCUMENTS

| WO | 2017140644 A1 | 8/2017 | |
|---|---|---|---|
| WO | WO-2018089634 A1 * | 5/2018 | ........... G06F 9/5061 |

OTHER PUBLICATIONS

Qiang, et al. "Technology Independent Information Model for Network Slicing; draft-qiang-coms-netslicing-information-model-02"; IETF, Jan. 26, 2018.
"System Architecture for the 5G System; Stage 2"; 3GPP TS 23.501 V1.4.0 (Sep. 2017).
"System Architecture for the 5G System; Stage 2"; 3GPP TS 23.501 V15.3.0 (Sep. 2018).
"Management of network slicing in mobile networks; Concepts, use cases and requirements"; 3GPP TS 28.530 V0.2.0 (Oct. 2017).
"Management of network slicing in mobile networks; Concepts, use cases and requirements"; 3GPP TS 28.530 V15.0.0 (Sep. 2018).
"Provisioning of network slicing for 5G networks and services"; 3GPP TS 28.531 V0.1.0 (Oct. 2017).
"Management and orchestration; Provisioning"; 3GPP TS 28.531 V15.0.0 (Sep. 2018).
3GPP TR 28.801 V15.0.0 (Sep. 2017);3rd Generation Partnership Project;Technical Specification Group Services and System Aspects;Telecommunication management;Study on management and orchestration of network slicing for next generation network (Release 15),total 78 pages.
3GPP TS 28530 V0.3.0 (Nov. 2017);3rd Generation Partnership Project;Technical Specification Group Services and System Aspects;Telecommunication management;Management of network slicing in mobile networks;Concepts, use cases and requirements (Release 15),total 18 pages.

* cited by examiner

| Logical topology description 1321 | NF name 1322 | NF type 1323 | Physical location 1324 | Process capability 1325 | Relative location ID 1326 |
|---|---|---|---|---|---|
| UPF-1 1301 | Aggregator 1302 | UPF 1303 | R NN1 address 1304 | X bps 1305 | 1 1306 |
| | | | | | |
| | | | | | |
| | | | | | |
| | | | | | |
| | | | | | |
| | | | | | |

FIG. 13

| NF Name | ID | Slice Specific | Area | Services |
|---|---|---|---|---|
| AMF | AMF-1 | Shared | | |
| | AMF-2 | Shared | | |
| AUSF | | Shared | | |
| NSSF | | Shared | | |
| NEF | | Shared | | |
| NRF | | Shared | | |
| PCF | | Shared | | |

FIG. 19

| NF Name | ID | Slice Specific | Area | Services | Capacity | IP Address |
|---|---|---|---|---|---|---|
| Common UPF | UPF-1 | Shared | | All Services | | X.2.1.1 |
| | UPF-2 | Specific | | | | X.2.1.2 |
| Classifier | UPF-3 | Specific | | UP link classifier, filter | | X.1.3.1 |
| Gateway | UPF-4 | Specific | | Anchor, firewall | | X.1.4.1 |

FIG. 20

| NF Name | ID | Area List | Services | Capacity | IP Address |
|---|---|---|---|---|---|
| gNB | gNB-1 | A1 | S1 | | X.1.3.1 |
| | gNB-1 | A1 | S2S1 | | X.1.3.2 |
| | gNB-1 | A2 | | | X.1.4.1 |
| | gNB-2 | | | | X.1.5.1 |

FIG. 21

| NF name | ID | Type | Source NFs | Destination NFs | Link ID | Source Node (type 2) | Destination Node (type 2) | Bandwidth (type 3) | Throughput | Latency | Physical Path |
|---|---|---|---|---|---|---|---|---|---|---|---|
| N2 | n2 | Bi-directional | RAN | AMF | n2-1 | gNB-1 | AMF-1 | | | | |
| | | | | | n2-2 | gNB-2 | AMF-2 | | | | |
| | | | | | n2-3 | gNB-1 | AMF-1 | | | | |
| | | | | | n2-3 | gNB-1 | AMF-2 | | | | |
| N3 | n3 | Bi-directional | RAN | UPF | N3-1 | gNB-1 | UPF-3 | | | | |
| N6 | n6 | Bi-directional | UPF | APP | N6-1 | UPF-4 | AS-1 | | | | |
| N4 | N$ | Bi-directional | SMF | UPF | | | | | | | |
| SMF-AMF | SMF-AMF | Bi-directional | SMF | AMF | SMF-AMF-1 | AMF-1 | SMF-1 | | | | |

FIG. 22

| NF Name | ID | Slice Specific | Area | Services | Capacity | IP Address |
|---|---|---|---|---|---|---|
| Application Servers | AS-1 | Shared | | | | |
| | AS-2 | Specific | | | | |
| AF | AF-1 | Specific | | | | |

FIG. 23

| Logical topology description 1321 | NF name 1322 | NF type 1323 | Physical location 1324 | Process capability 1325 | Relative location ID 1326 |
|---|---|---|---|---|---|
| UPF-1 1301 | Aggregator 1302 | UPF 1303 | R NN1 address 1304 | X bps 1305 | 1 |
| UPF-2 1301 | Aggregator 1302 | UPF 1303 | R NN2 address 1304 | X bps 1305 | 4 |
| UPF-3 1301 | Aggregator 1302 | UPF 1303 | Cloud 3 address 1304 | Y bps 1305 | |
| UPF-4 1301 | Aggregator 1302 | UPF 1303 | Cloud 4 address 1304 | Z bps 1305 | |
| CPF-1 1301 | | CPF 1303 | Cloud 1 address 1304 | | |
| CPF-2 1301 | | CPF 1303 | Cloud 2 address 1304 | | |
| MEC 1301 | Application Name 1302 | MEC 1303 | Interface address of DN for accessing MEC | | |

| SOURCE ↓ | DESTINATION → 2620 | | | | | | | 2800 |
|---|---|---|---|---|---|---|---|---|
| | UPF-1 | UPF-2 | UPF-3 | UPF-4 | CPF-1 | CPF-2 | MEC-1 | |
| UPF-1 | X 2844 | | Y 2846 | | 2843 | | | |
| UPF-2 | | X 2855 | Y 2856 | | 2853 | | | |
| UPF-3 | Y 2864 | Y 2865 | X 2866 | Y 2867 | 2863 | | | |
| UPF-4 | | | Y 2876 | X 2877 | 2873 | | Y 2871 | |
| CPF-1 | Y 2834 | Y 2835 | Y 2836 | Y 2837 | X 2833 | Y 2832 | | |
| CPF-2 | | | | | Y 2823 | X 2822 | Y 2821 | |
| MEC-1 | | | | Y 2817 | | 2812 | X 2811 | |

| SOURCE ↓ | DESTINATION → | | | | | | |
|---|---|---|---|---|---|---|---|
| | UPF-1 | UPF-2 | UPF-3 | UPF-4 | CPF-1 | CPF-2 | MEC-1 |
| UPF-1 | X 2844 | | 0.5M 3046 | | | | |
| UPF-2 | | X 2855 | 0.3M 3056 | | | | |
| UPF-3 | 0.2M 3064 | 0.1M 3065 | X 2866 | 0.9M 3067 | | | |
| UPF-4 | | | 0.3M 3076 | X 2877 | | | 0.9M 3071 |
| CPF-1 | | Y 2835 | Y 2836 | Y 2837 | X 2833 | Y 2832 | |
| CPF-2 | Y 2834 | | | | Y 2823 | X 2822 | Y 2821 |
| MEC-1 | | | | 0.3M 3017 | | | X 2811 |

FIG. 30

METHOD AND APPARATUS FOR THE SPECIFICATION OF A NETWORK SLICE INSTANCE AND UNDERLYING INFORMATION MODEL

CROSS-REFERENCE TO RELATED APPLICATIONS

The present disclosure is related to, and claims benefit of, U.S. Provisional Patent Application No. 62/588,183 entitled "Method and Apparatus for the Specification of a Network Slice Instance", and U.S. Provisional Patent Application No. 62/588,216 entitled "Information Model for Managed Network Slice Object Class", both filed 17 Nov. 2017, the entire contents of which are incorporated by reference, inclusive of all filed references and appendices.

TECHNICAL FIELD

The present disclosure relates to virtual telecommunication networks (VNs) and particular embodiments or aspects relate to slice instances and mechanisms to specify, deploy and operate a slice instance in accordance therewith and to an underlying information model for defining and configuring a managed network slice object class (MNSOC).

BACKGROUND

The demand for wireless resources in terms of bandwidth and throughput is ever-increasing. One approach under consideration to meet this increasing demand is through virtualization of networks, in which network resources and functionality are downloaded into one or more existing network nodes or points of presence (PoP) to provide a dynamic service level capability for a particular customer service provider and its end-users, as and when appropriate.

In some approaches, a customer may subscribe with an MNO to be provided one or more so-called virtual network "slices" of network resources. Typically each network slice is dynamically allocated to provide certain relatively isolated and/or homogeneous (in kind and level) services to a class of devices of relatively homogeneous end-users or subscribers of the customer, such as a utility and its remotely-located smart meters. In some examples, a plurality of the customer's end-users may make up a user group of the customer.

From the perspective of the customer, it has obtained a separate telecommunications network for its service(s), while from the perspective of the mobile network operator (MNO) offering such service capability, the MNO's network resources and functions are shared with other VNs in a manner substantially transparent to the customer and its end-users.

In network slicing, multiple virtual networks utilize a shared physical network infrastructure. The network functionality of a particular slice may be implemented by downloading and instantiating, as a virtual network function (VNF), certain network functionality from cloud-based resources to one or more existing PoPs. A given PoP may have downloaded and instantiated thereon one or more than one VNF, each corresponding to one or more than one slice. When the functionality is no longer appropriate, the corresponding VNF may be terminated or deactivated or modified to reflect more appropriate functionality.

Typically, a MNO designs or develops a given network slice and deploys an instance of it (network slice instance "NSI") by the download and instantiation of the network slice and/or one or more VNFs corresponding to the design of the network slice. Eventually operators of the NSI use control plane (CP) 108 functions (CPFs) to deliver traffic over the deployed NSI.

A network slice may be considered to be an "end-to-end" ("E2E") network slice in that NSI crosses a plurality of segments, clusters, subnets, zones and/or domains (collectively "segments"). E2E network slicing has been identified as one of the main deliverables of following generations of mobile networks. However different segments may exhibit disparate technologies, actors and/or roles, which inhibit the provisioning of a E2E network slice.

While draft 3GPP Technical Specification TS 28.530 entitled "Management of network slicing in mobile networks; Concepts, use cases and requirements v.0.2.0" introduces the concept of a Managed Object Class, it provides few details and few managed objects relating to network slice management.

As such, the basic resources or atomic components that can be used to construct a network slice are not described.

Accordingly, there may be a need for a mechanism to specify, deploy and operate an NSI that is not subject to one or more limitations of the prior art.

Accordingly, there may be also be a need for a detailed description of atomic components and their relationship in an object class structure for mobile networks, that covers all parts—both 3GPP and non-3GPP parts (including, without limitation, non-3GPP access networks, such as WI-FI or fixed access systems, transport networks (TNs), operator's local area data networks (LADNs), application functions AFs) and/or other service functions, application servers and/or user devices)—of the network, that is not subject to one or more limitations of the prior art.

This background is intended to provide information that may be of possible relevance to the present invention. No admission is necessarily intended, nor should be construed, that any of the preceding information constitutes prior art against the present invention.

SUMMARY

It is an object of the present disclosure to obviate or mitigate at least one disadvantage of the prior art.

According to a first broad aspect of the present disclosure, there is disclosed a function in a communications network, comprising: a processor; and a non-transitory memory for storing instructions that when executed by the processor, cause the function to: communicate a specification of an NSI that identifies an NF; and operate the NF in accordance with the specification.

In an embodiment, the function can be an MF or an NSMF. In an embodiment, the specification can include a specification of an NSSI and the function can be an MF or an NSSMF.

In an embodiment, the instructions can cause the function to obtain the specification, the specification specifying at least one of: at least one component of the instance, a connection coupling components of the instance and an attribute of the component.

In an embodiment, the instructions can cause the function to develop an information model describing the instance with the specification. In an embodiment, the specification can identify a plurality of NFs and the component can be one of the identified NFs.

In an embodiment, the connection can provide information about at least one of: a topology of the components of the instance, connectivity of an NSSI that is a component of the instance and at least one SFC coupling a plurality of the NFs.

In an embodiment, the instructions can further cause the function to obtain the specification of the NSI in at least one of following solutions: loosely-defined solution, moderately-defined solution, and fully-defined solution. In an embodiment, in respect of a specification that is other than loosely-defined, the specification can comprise a topology description of the instance that describes a plurality of the NFs identified in the NF attribute description and an existence of at least one link coupling two identified NFs. In an embodiment, a first one of the identified NFs can be a CPF and the at least one link can couple the CPF to a second one of the identified NFs controlled by the CPF. In an embodiment, the at least one link can be a logical link coupling the two identified NFs. In an embodiment, the topology description of the instance can identify an UL direction and a DL direction of the logical link. In an embodiment, the instance can be fully-defined and the topology description of the instance can identify a capacity of the logical link.

In an embodiment, the identified NF to which the specification is communicated is a CPF.

In an embodiment, the instructions can cause the function to communicate by one of sending and receiving a configuration request comprising the specification.

In an embodiment, the instructions can further cause the function to communicate by sending a storage request including the specification to a database and informing the NF to access the database comprising the at least one aspect of the specification to a distribution function. In an embodiment, the instructions can further cause the function to communicate by sending a storage request including the specification to a database and informing a distribution function to access the database and communicate the specification to the NF.

In an embodiment, the function can be an NF. In an embodiment, the NF can be one of the NF that the specification of the NSI identifies. In an embodiment, the instructions can further cause the function to execute at least one of instantiated, managing and controlling the NF identified by the specification of the NSI in accordance with at least one aspect of the specification of the NSI. IN an embodiment, the instructions can further cause the function to communicate by obtaining a notification to access a database and obtaining at least one aspect of the specification from the database.

According to a second broad aspect of the present disclosure, there is disclosed a method comprising: communicating a specification of an NSI that identifies an NF; and operating the identified NF in accordance with the specification.

Some aspects and embodiments of the present disclosure may provide an NSI specification and a method of configuring an NSI at an NSDF.

BRIEF DESCRIPTION OF THE DRAWINGS

Example embodiments of the present disclosure will now be described by reference to the following figures, in which identical reference numerals in different figures indicate identical elements and in which:

FIG. 13 is an example NF attribute description table according to an example;

FIG. 19 is an example tabular representation of components, connections thereto and attributes thereof, of example CPFs in the NSI according to an example;

FIG. 20 is an example tabular representation of components, connections thereto and attributes thereof, of example UPFs in the NSI according to an example;

FIG. 21 is an example tabular representation of components, connections thereto and attributes thereof, of example (R)AN components in the NSI according to an example;

FIG. 22 is an example tabular representation of components, connections thereto and attributes thereof, of example TN components in the NSI according to an example;

FIG. 23 is an example tabular representation of components, connections thereto and attributes thereof, of example application components in the NSI according to an example;

FIG. 25 is the NF attribute description table corresponding to the example scenario of FIG. 24;

FIG. 28 is an example NSI topology interconnection matrix corresponding to the example scenario of FIG. 27;

FIG. 30 is an example NSI topology interconnection matrix corresponding to the example scenario of FIG. 28;

Figure 1:
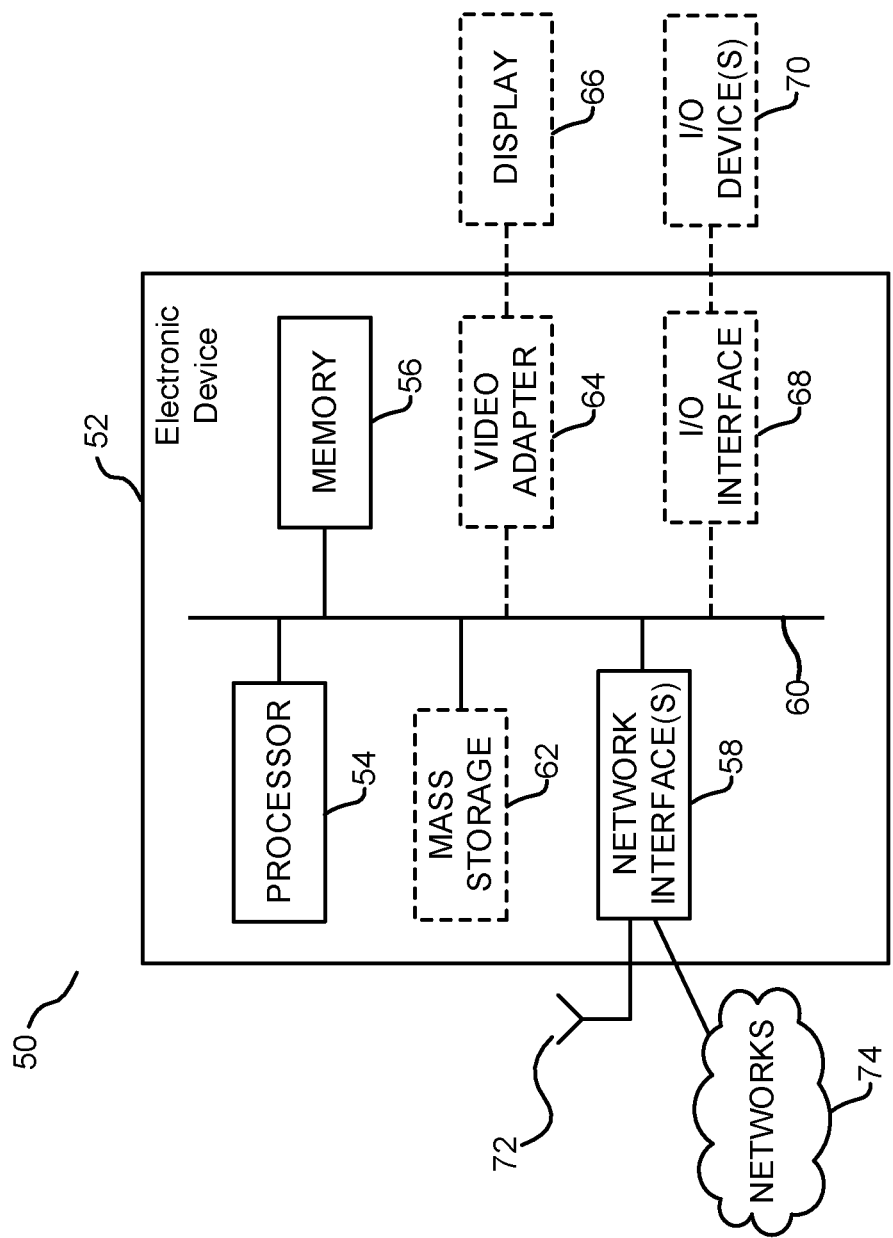
FIG. 1 is a block diagram of an electronic device within a computing and communications environment 50 that may be used for implementing devices and methods in accordance with representative embodiments of the present disclosure.

In the present disclosure, for purposes of explanation and not limitation, specific details are set forth in order to provide a thorough understanding of the present disclosure. In some instances, detailed descriptions of well-known devices, circuits and methods are omitted so as not to obscure the description of the present disclosure with unnecessary detail.

Accordingly, the system and method components have been represented where appropriate by conventional symbols in the drawings, showing only those specific details that are pertinent to understanding the embodiments of the present disclosure, so as not to obscure the disclosure with details that will be readily apparent to those of ordinary skill in the art having the benefit of the description herein.

Any feature or action shown in dashed outline may in some example embodiments be considered as optional.

DESCRIPTION

FIG. 1 is a block diagram of an electronic device (ED) 52 illustrated within a computing and communications environment 50 that may be used for implementing the devices and methods disclosed herein. In some embodiments, the ED 52 may be an element of communications network infrastructure, such as a base station (for example a NodeB, an evolved Node B (eNodeB or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or Public Land Mobility Network (PLMN). In other embodiments, the ED 52 may be a device that connects to the network infrastructure over a radio interface, such as a mobile phone, smart phone or other such device that may be classified as a User Equipment (UE). In some embodiments, the ED 52 may be a Machine Type Communications (MTC) device (also referred to as a machine-to-machine (m2m) device), or another such device that may be categorized as a UE despite not providing a direct service to a user. In some references, an ED 52 may also be referred to as a mobile device, a term intended to reflect devices that connect to a mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The ED 52 typically includes a processor 54, such as a Central Processing Unit (CPU) and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed outline).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The ED 52 may also include one or more network interfaces 58, which may include at least one of wired network interface and a wireless network interface. As illustrated in FIG. 1, a network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (eg. an eNB). When ED 52 is infrastructure at the radio edge of a network 74, both wired and wireless network interfaces may be included. When ED 52 is a wirelessly connected deice, such as a UE, radio access network interface 72 may be present and it may be supplemented by other wireless interfaces such as WiFi network interfaces. The network interfaces 58 allow the ED 52 to communicate with remote entities such as those connected to network 74.

The mass storage 62 may comprise any type of non-transitory storage device configured to store data, programs and other information and to make the data, programs and other information accessible via the bus 60. The mass storage 62 may comprise, for example, one or more of a solid state drive, hard disk drive, a magnetic disk drive or an optical disk drive. In some embodiments, mass storage 62 may be remote to ED 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed outline) provide interface to couple the ED 52 to external input and output devices. Examples of input and output devices include a display 66 coupled to the video adapter 64 and an I/O device 70 such as a touch-screen coupled to the I/O interface 68. Other devices may be coupled to the ED 52, and additional or fewer interfaces may be utilized. For example, a serial interface such as a Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, ED 52 may be a stand-alone device, while in other embodiments ED 52 may be resident within a data center. A data center, as will be understood in the art, is a collection of computing resources (typically in the form of services) that can be used as a collective computing and storage resource. Within a data center, a plurality of services can be connected together to provide a computing resource pool upon which virtualized entities can be instantiated. Data centers can be interconnected with each other to form networks consisting of pooled computing and storage resources connected to each other by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network 74) can be divided between different sub-networks, in some cases in the form of a resource slice. If the resources across a number of connected data centers or other collection of nodes are sliced, different network slices can be created.

Figure 2:
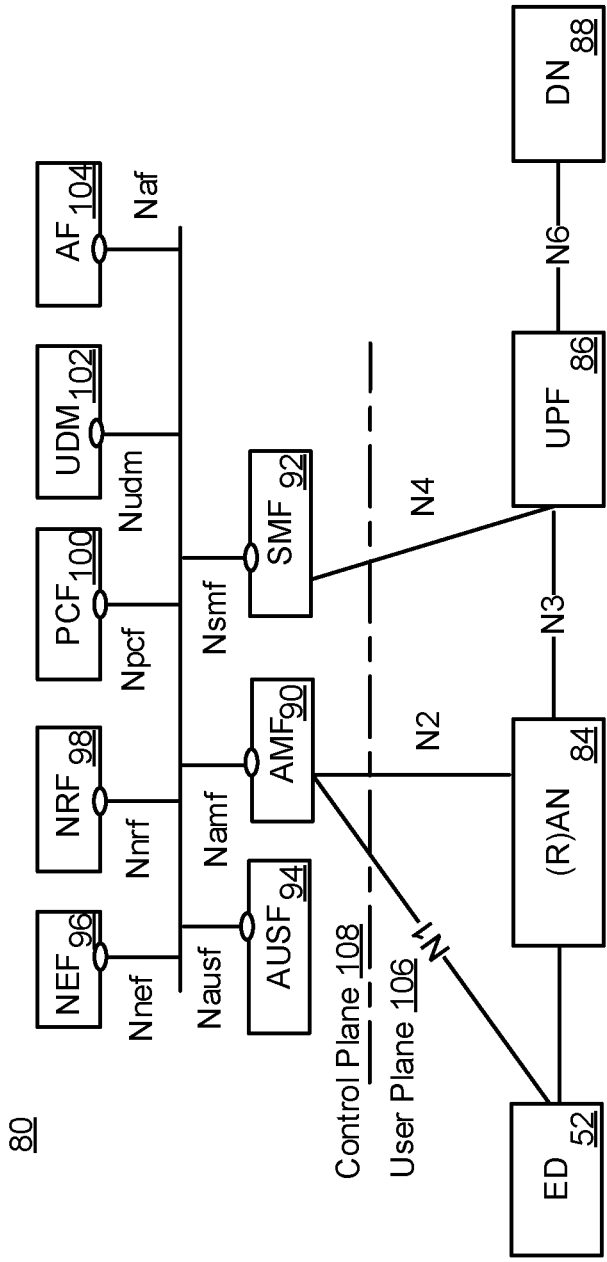
FIG. 2 is a block diagram illustrating a service-based view of a system architecture of a 5G Core Network.
Figure 24:
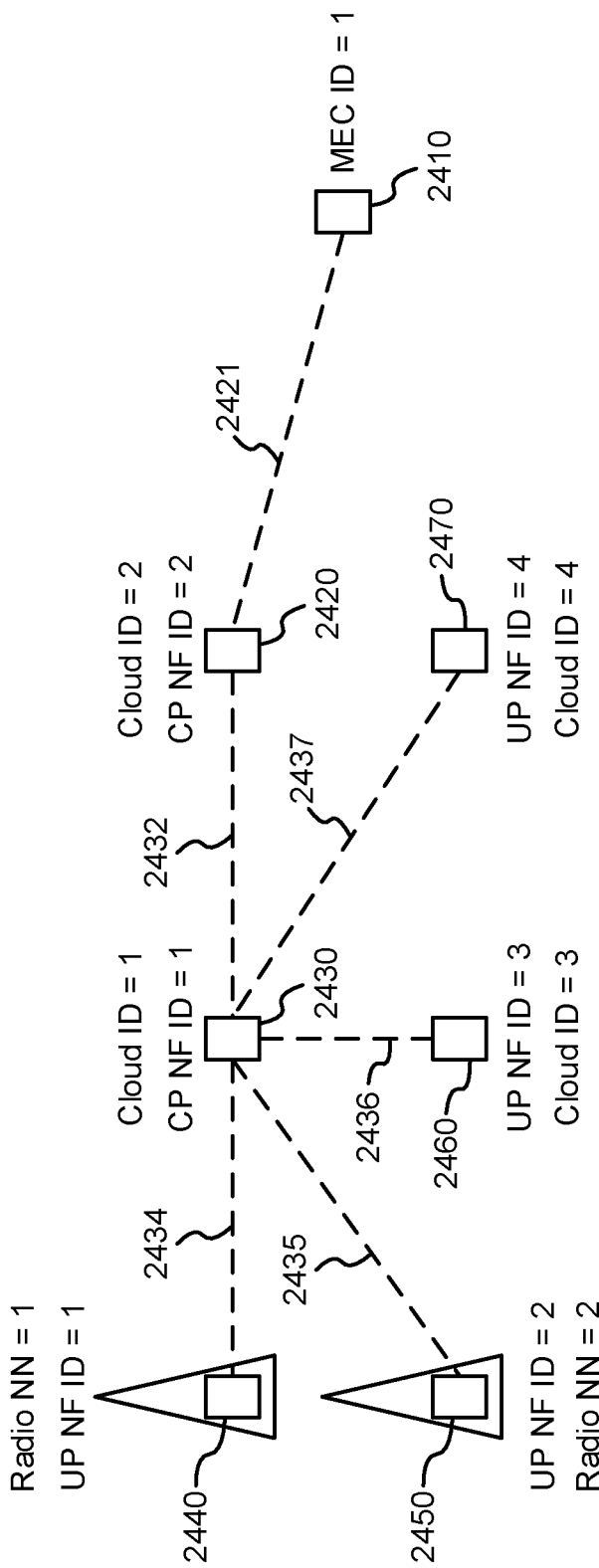
FIG. 24 is a schematic diagram of an example loosely-defined NSI according to an example.

FIG. 2 illustrates a service-based architecture 80 for a 5G or Next generation Core Network (5GCN/NGCN/NCN). This illustration depicts logical connections between nodes and functions, and its illustrated connections should not be interpreted as direct physical connection. ED 50 forms a radio access network connection with a (Radio) Access Network node (R)AN 84, which is connected to a User Plane (UP) Function (UPF) 86 such as a UP Gateway over a network interface such as an N3 interface. UPF 86 connected to a Data Network (DN) 88 over a network interface such as an N6 interface. DN 88 may be a data network used to provide an operator service, or it may be outside the scope of the standardization of the Third Generation Partnership Project (3GPP), such as the Internet, a network used to provide third party service, and in some embodiments DN 88 may represent an Edge Computing network or resources, such as a Mobile Edge Computing (MEC) network 2410 (FIG. 24). ED 52 also connects to the Access and Mobility Management Function (AMF) 90. The AMF 90 is responsible for authentication and authorization of access requests, as well as mobility management functions. The AMF 90 may perform other roles and functions as defined by the 3GPP Technical Specification (TS) 23.501. In a service-based view, AMF 90 can communicate with other functions through a service-based interface denoted as Namf. The Session Management Function (SMF) 92 is an NF that is responsible for the allocation and management of IP addresses that are assigned to a UE as well as the selection of a UPF 86 (or a particular instance of a UPF 86) for traffic associated with a particular session of ED 52. The SMF 92 can communicate with other functions, in a service-based view, through a service-based interface denoted as Nsmf. The Authentication Server function (AUSF) 94 provides authentication services to other NFs over a service-based Nausf interface. A Network Exposure Function (NEF) 96 can be deployed in the network to allow servers, functions and other entities such as those outside a trusted domain to have exposure to services and capabilities within the network. In one such example, the NEF 96 can act much like a proxy between an application server outside the illustrated network and NFs such as the Policy Control Function (PCF) 100, the SMF 92 and the AMF 90, so that the external application server can provide information that may be of use in the setup of the parameters associated with a data session. The NEF 96 can communicate with other NFs through a service-based Nnef network interface. The NEF 96 may also have an interface to non-3GPP functions. A Network Repository Function (NRF) 98, provides network service discovery functionality. The NRF 98 may be specific to the PLMN or network operator, with which it is associated. The service discovery functionality can allow NFs and UEs connected to the network to determine where and how to access existing NFs, and may present the service-based interface Nnrf. PCF 100 communicates with other NFs over a service-based Npcf interface, and can be used to provide policy and rules to other NFs, including those within the control plane (CP) 108. Enforcement and application of the policies and rules is not necessarily the responsibility of the PCF 100, and is instead typically the responsibility of the functions to which the PCF 100 transmits the policy. In one such example the PCF 100 may transmit policy associated with session management to the SMF 92. This may be used to allow for a unified policy framework with which network behaviour can be governed. A Unified Data Management Function (UDM) 102 can present a service based Nudm interface to communicate with other NFs, and can provide data storage facilities to other NFs. Unified data storage can allow for a consolidated view of network information that can be used to ensure that the most relevant information can be made available to different NFs from a single resource. This can make implementation of other NFs easier, as they do not need to determine where a particular type of data is stored in the network. The UDM 102 may be implemented as a UDM Front End (UDM-FE) and a User Data Repository (UDR). The PCF 100 may be associated with the UDM 102 because it may be involved with requesting and providing subscription policy information to the UDR, but it should be understood that typically the PCF 100 and the UDM 102 are independent functions. The PCF 100 may have a direct interface to the UDR. The UDM-FE receives requests for content stored in the UDR, or requests for storage of content in the UDR, and is typically responsible for functionality such as the processing of credentials, location management and subscription management. The UDR-FE may also support any or all of authentication credential processing, user identification handling, access authorization, registration/mobility management, subscription management and Short Message Service (SMS) management. The UDR is typically responsible for storing data provided by the UDM-FE. The stored data is typically associated with policy profile information (which may be provided by PCF 100) that governs the access rights to the stored data. In some embodiment, the UDR may store policy data, as well as user subscription data that may include any or all of subscription identifiers, security credentials, access and mobility related subscription data and session related data. Application Function (AF) 104 represents the non-data plane (also referred to as the non-user plane) functionality of an application deployed within a network operator domain and within a 3GPP-compliant network. The AF 104 interacts with other core NFs through a service-based Naf interface, and may access network capability exposure information, as well as provide application information for use in decisions such as traffic routing. The AF 104 can also interact with functions such as the PCF 100 to provide application-specific input into policy and policy enforcement decisions. It should be understood that in many situations the AF 104 does not provide network services to other NFs, and instead is often viewed as consumer or user of services provided by other NFs. An application outside the 3GPP network can perform many of the same functions as AF 104 through the use of NEF 96.

ED 52 communicates with NFs that are in the UP 106, and the CP 108. The UPF 86 is a part of the CN UP 106 (DN 88 being outside the 5GCN). (R)AN 84 may be considered as a part of a UP 106, but because it is not strictly a part of the CN 108, it is not considered to be a part of the CN UP 106. AMF 90, SMF 92, AUSF 94, NEF 96, NRF 98, PCF 100 and UDM 102 are functions that reside within the CN CP 108, and are often referred to as CPFs. AF 104 may communicate with other functions within CN CP 108 (either directly or indirectly through the NEF 96), but is typically not considered to be a part of the CN CP 108.

Those skilled in the art will appreciate that there may be a plurality of UPFs 86 connected in series between the (R)AN 84 and the DN 88, and as will be discussed with respect to FIG. 3, multiple data sessions to different DNs can be accommodated through the use of multiple UPFs in parallel.

Figure 3:
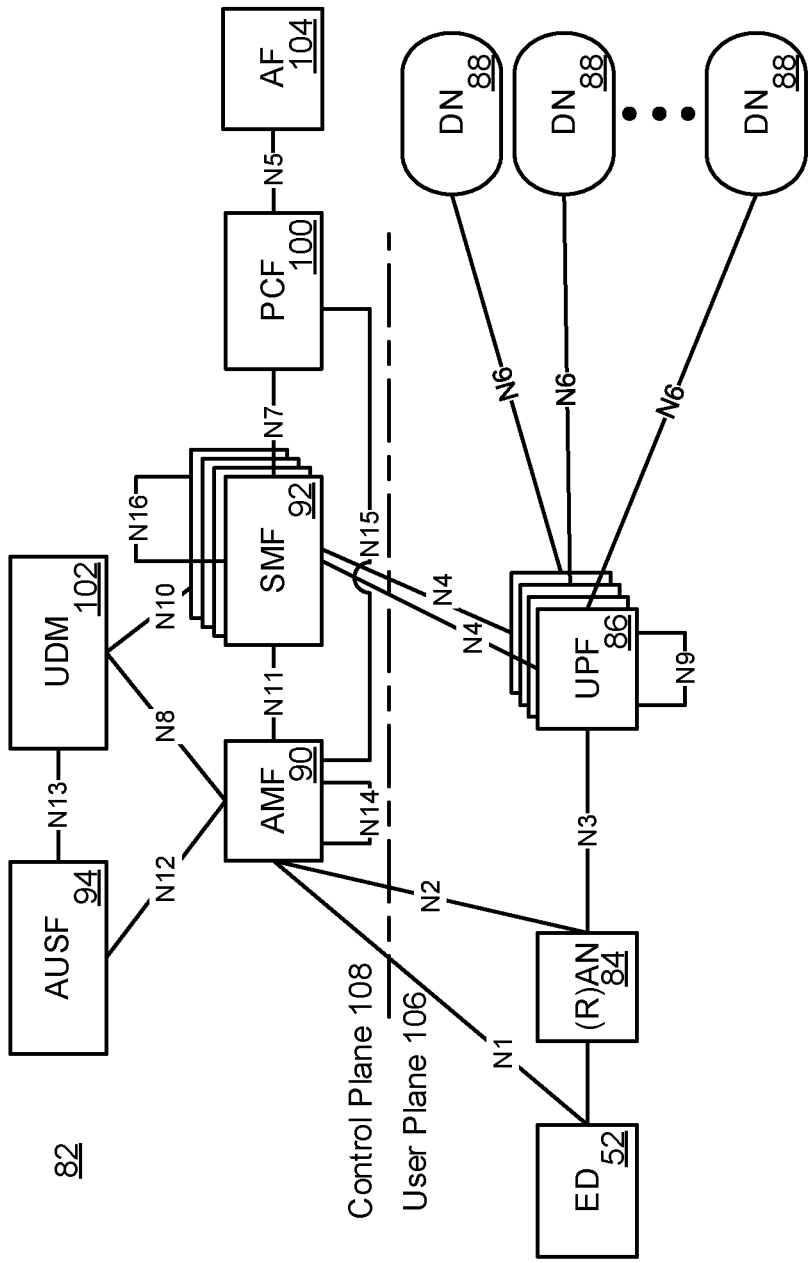
FIG. 3 is a block diagram illustrating the system architecture of a 5G Core network as shown in FIG. 2 from the perspective of reference point connectivity.

FIG. 3 illustrates a reference point representation of a 5GCN architecture 82. For the sake of clarify, some of the NFs illustrated in FIG. 2 are omitted from this figure, but it should be understood that the omitted functions and those not illustrated in either FIG. 2 or FIG. 3) can interact with the illustrated functions.

ED 52 connects to both (R)AN 84 (in the UP 106) and AMF 90 (in the CP 108). The ED-to-AMF connection is an N1 connection. (R)AN 84 also connects to the AMF 90, and does so over an N2 connection. The (R)AN 84 connects to a UPF function 86 over an N3 connection. The UPF 86 is associated with a PDU session, and connects to the SMF 92 over an N4 interface to receive session control information. If the ED 52 has multiple PDU sessions active, they can be supported by multiple different UPFs 86, each of which is connected to an SMF 92 over an N4 interface. It should be understood that from the perspective of reference point representation, multiple instances of either an SMF 92 or an UPF 86 are considered as distinct entities. The UPFs 86 each connect to a DN 88 outside the 5GCN over an N6 interface. SMF 92 connects to the PCF 100 over an N7 interface, while the PCF 100 connects to an AF 104 over an N5 interface. The AMF 90 connects to the UDM 102 over an N8 interface. If two UPFs 86 in UP 106 connect to each other, they can do so over an N9 interface. The UDM 102 can connect to an SMF 92 over an N10 interface. The AMF 90 and SMF 92 connect to each other over an N11 interface. An N12 interface connects the AUSF 94 to the AMF 90. The AUSF 94 can connect to the UDM 102 over an N13 interface. In networks in which there is a plurality of AMFs 90, they can connect to each other over an N14 interface. The PCF 100 can connect to an AMF 90 over the N15 interface. If there is a plurality of SMFs 92 in the network, they can communicate with each other over an N16 interface.

It should also be understood that any or all of the functions and nodes, discussed above with respect to the architectures 80 and 82 of the 5GCN, may be virtualized within a network, and the network itself may be provided as network slice of a larger resource pool, as will be discussed below.

Figure 4:
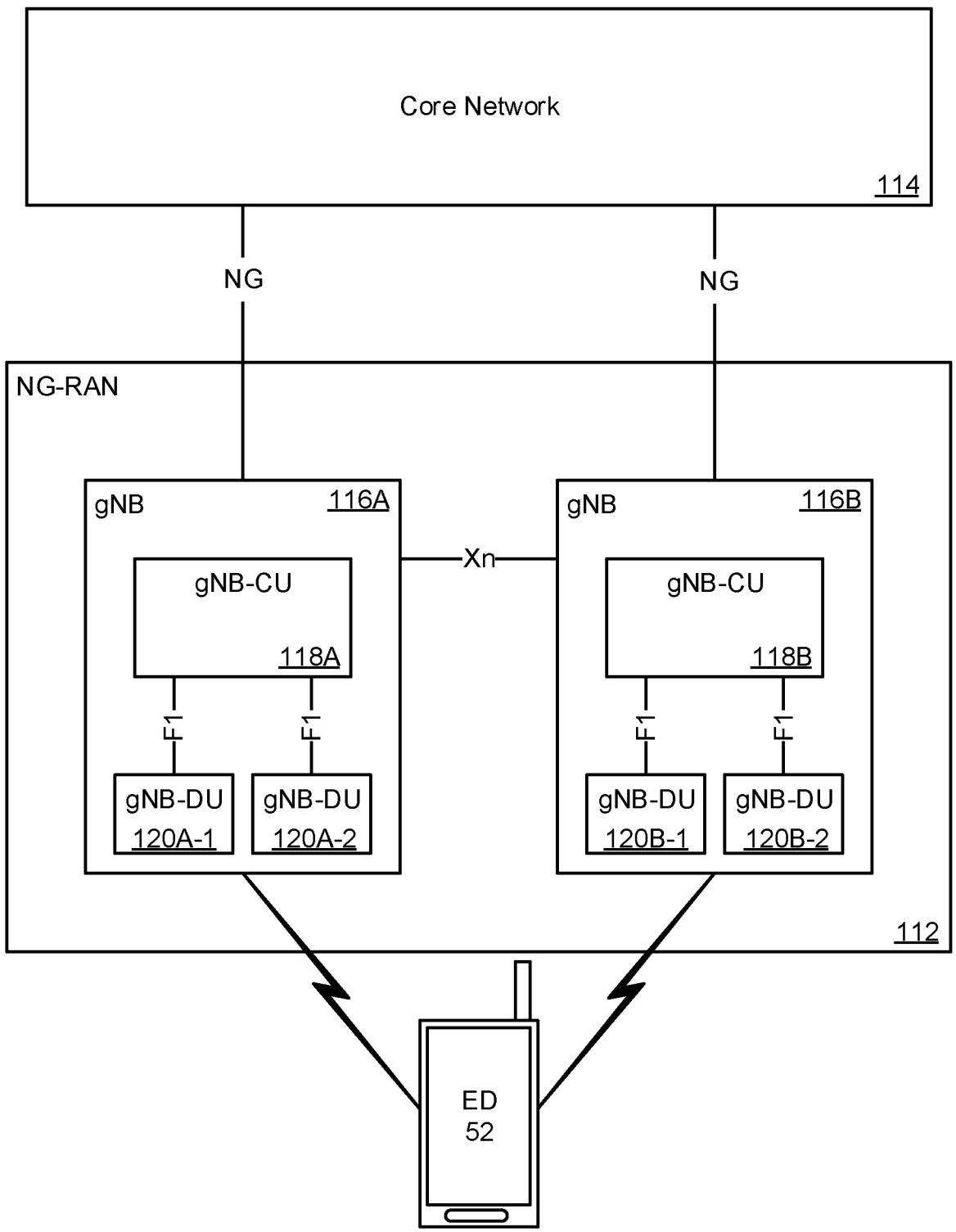
FIG. 4 is a block diagram illustrating an architecture of a 5G Radio Access network architecture.

FIG. 4 illustrates a proposed architecture 110 for the implementation of a Next Generation Radio Access network (NG-(R)AN) 112, also referred to as a 5G (R)AN. NG-(R)AN 112 is the radio access network that connects an ED 52 to a CN 114. Those skilled in the art will appreciate that CN 114 may be the 5GCN (as illustrated in FIG. 2 and FIG. 3). In other embodiments, the CN 114 may be a 4G Evolved Packet Core (EPC) network. Nodes with NG-(R)AN 112 connect to the 5G CN 114 over an NG interface. This NG interface can comprise both the N2 interface to a CP 108 and an N3 interface to a UPF 86 as illustrated in FIG. 2 and FIG. 3. The N3 interface can provide a connection to a CN UPF. NG-(R)AN 112 includes a plurality of radio access nodes that can be referred to as a gNB. In the NG-(R)AN 112, gNB 116A and gNB 116B are able to communicate with each other over an Xn interface. Within a single gNB 116A, the functionality of the gNB may be decomposed into a Centralized Unit (gNB-CU) 118A and a set of distributed units (gNB-DU 120A-1 and gnB-DU 120A-2, collectively referred to as 120A). gNB-CU 118A is connected to a gNB-DU 120A over an F1 interface. Similarly gNB 116B has a gNB-CU 118B connecting to a set of distributed units gNB-DU 120B-1 and gNB-DU 120B-2, collectively referred to as 120B). Each gNB DU may be responsible for one or more cells providing radio coverage within the PLMN.

The division of responsibilities between the gNB-CU and the gNB-DU has not been fully defined at this time. Different functions, such as the radio resource management functionality may be placed in one of the CU and the DU. As with all functional placements, there may be advantages and disadvantages to placement of a particular NF in one or the other location. It should also be understood that any or all of the functions discussed above with respect to the NG-(R)AN 112 may be virtualized within a network, and the network itself may be provided as network slice of a larger resource pool, as will be discussed below.

Figure 5:
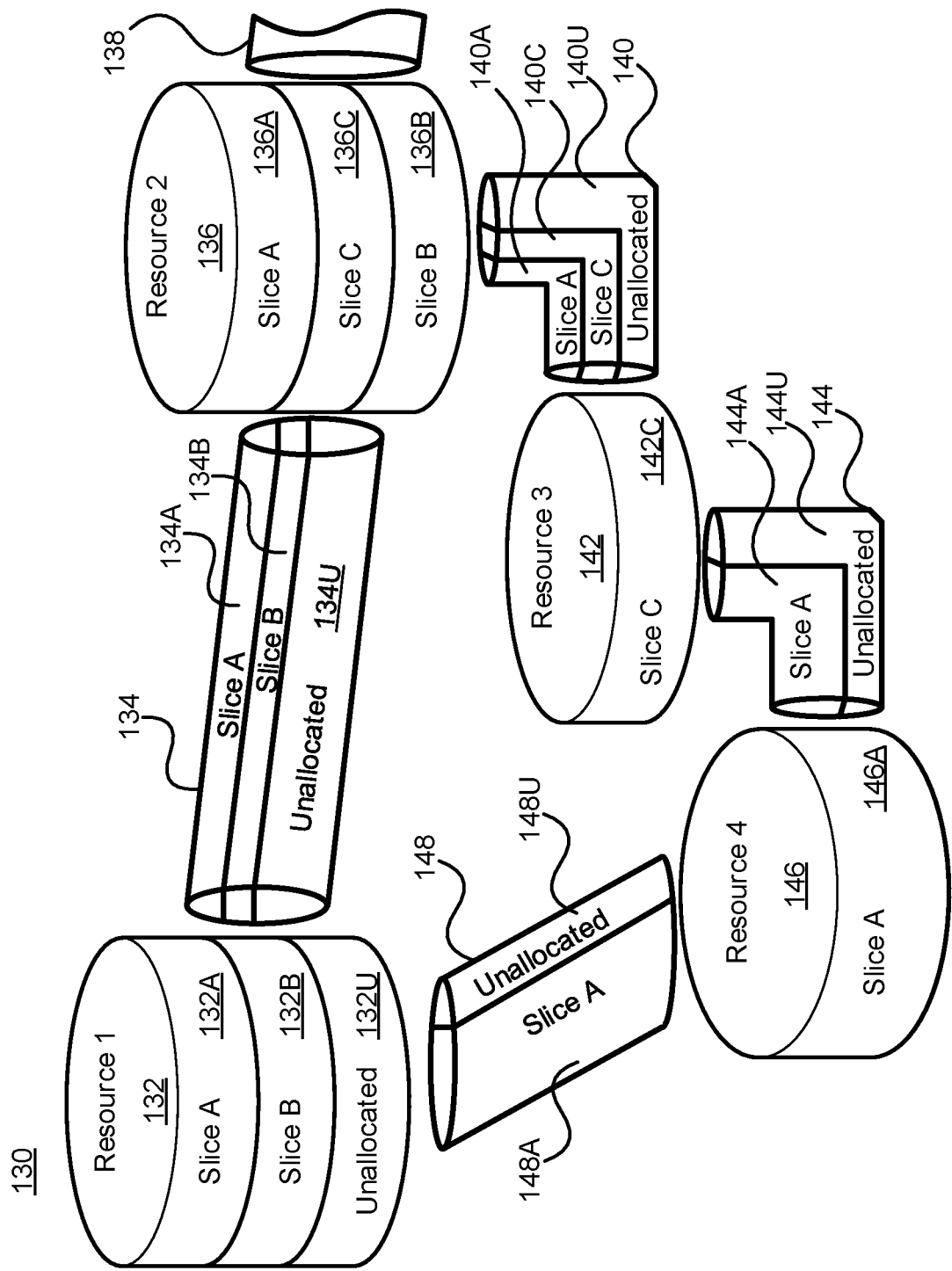
FIG. 5 is a block diagram schematically illustrating an architecture in which network slicing can be implemented.

FIG. 5 illustrates an architecture 130 that connects a plurality of connectivity, compute and storage resources, and supports network slicing. In the following, resources are connected to other discrete resources through Connectivity Resources 134, 138, 140, 144 and 148. It will be understood that as NFs are instantiated within resources, they may be connected to each other by virtual connections that in some embodiments do not rely upon the physical connectivity resources illustrated, but instead may be connected to each other by virtual connections, which will also be considered as connectivity resources. Resource 1 132 is connected to Resource 2 136 by Connectivity Resource 134. Resource 2 136 is connected to unillustrated resources through Connectivity Resource 138, and is also connected to Resource 3 142 by Connectivity Resource 140, and Resource 1 132 is connected to Resource 4 146 by Connectivity Resource 148. Resource 1 132, Resource 2 136, Resource 3 142 and Resource 4 146 should be understood as representing both compute and storage resources, although specialized functions may also be included. In some embodiments, a specialized NF may be represented by any or all of Resource 1 132, Resource 2 136, Resource 3 142 and Resource 4 146, in which case, it may be the capability or capacity of the NF that is being sliced. Connectivity Resources 134, 138, 140, 144 and 148 may be considered, for the following discussions, as logical links between two points (eg. between two data centers) and may be based on a set of physical connections.

Resource 1 132 is partitioned to allocate resources to Slice A 132A, and Slice B 132B. A portion 132U of the resources available to Resource 1 132 remains unallocated. Those skilled in the art will appreciate that upon allocation of the network resources to different slices, the allocated resources are isolated from each other. This isolation, both in the compute and storage resources, ensures that processes in one slice do not interact or interfere with the processes and functions of the other slices. This isolation can be extended to the connectivity resources as well. Connectivity Resource 134 is partitioned to provide connectivity to Slice A 134A and Slice B 134B, and also retains some unallocated bandwidth 134U. it should be understood that in any resource that either has unallocated resources or that has been partitioned to support a plurality of resources, the amount of the resource (eg. the allocated bandwidth, memory, or number of processor cycles) can be varied or adjusted to allow changes to the capacity of each slice. In some embodiments, slices are able to support "breathing", which allows the resources allocated to the slice to increase and decrease along with any of the available resources, the required resources, anticipated resource need, or other such factors, alone or in combination with each other. In some embodiments, the allocation of resources may be in the form of soft slices in which a fixed allocation is not committed and instead the amount of the resource provided may be flexible. In some embodiments, a soft allocation may allocate a percentage of the resource to be provided over a given time window, for example 50% of the bandwidth of a connection over a time window. This may be accompanied by a minimum guaranteed allocation. Receiving a guarantee of 50% of the capacity of a connectivity resource at all times may provide very different service characteristics than receiving 50% of the capacity of the connectivity resource over a ten second window.

Resource 2 136 is partitioned to support allocations of the available compute and storage resources to Slice A 136A, Slice C 136C and Slice B 136B. Because there is no allocation of resources in connectivity resource 134 to Slice C, Resource 2 136 may, in some embodiments, not provide a network interface to Slice C 136C to interact with connectivity resource 134. Resource 2 136 can provide an interface to different slices to Connectivity Resource 138 in accordance with the slices supported by Connectivity Resource 138. Connectivity Resource 140 is allocated to Slice A 140A and Slice C 140C with some unallocated capacity 140U. Connectivity Resource 140 connects Resource 2 136 with Resource 3 142.

Resource 3 142 provides compute and storage resources that are allocated exclusively to Slice C 142C, and is also connected to Connectivity Resource 144 which in addition to the unallocated portion 144U includes an allocation of Connectivity Resource 144A to slice A. it should be noted that from the perspective of functions or processes within Slice A, Resource 3 142 may not be visible. Connectivity Resource 144 provides a connection between Resource 3 142 and Resource 4 146, whose resources are allocated entirely to Slice A 146.

Resource 4 146 is connected to Resource 1 132 by Connectivity Resource 148, which has a portion of the connection allocated to Slice A 148, while the balance of the resources 148U are unallocated.

Figure 6:
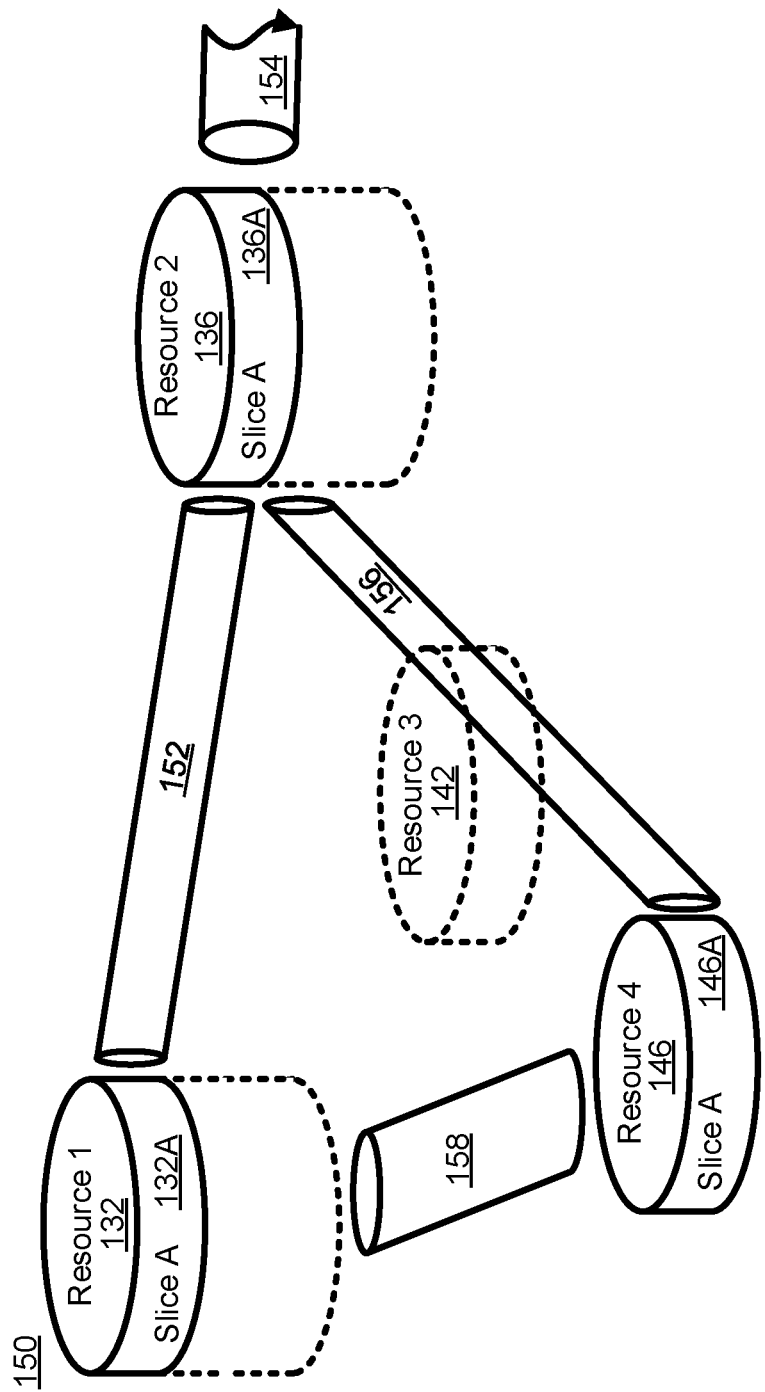
FIG. 6 is a block diagram illustrating the architecture discussed in FIG. 5 from the perspective of a single slice.

FIG. 6 illustrates the view of the architecture 136 of FIG. 5 as would be seen from the perspective of Slice A. This may be understood as a view of the resources allocated to Slice A 150 across the illustrated network segment. From within Slice A 150, only the portions of the resources that have been allocated to Slice A 150 are visible. Thus, instead of being able to see the full capacity and capability of Resource 1 132, the capabilities and capacity of the portion allocated to Slice A 132A is available. Similarly, instead of being able to see the capacity and capabilities of Resource 2 136, only the capabilities and capacity of the portion allocated to Slice A 136A are available. Because nothing from Resource 3 142 had been allocated to Slice A 150, Resource 3 142 is not present within the topology of Slice A 150. All of the capacity and capability of Resource 4 146 was allocated to Slice A 146, and as such is present within Slice A 150. Slice A 132A of Resource 1 132 is connected to Slice A 136A of Resource 2 136 by logical link 152. Logical Link 152 may correspond to the portion of connectivity resource 134 allocated to Slice A 134A. Slice A 136A is connected to logical link 154 (representative of the portion of connectivity resource 138 allocated to Slice A 150), and is connected to Slice A 146A by logical link 156. Logical link 156 is representative of the portions of connectivity resource 140 and connectivity resource 144 that have been allocated to Slice A (portions 140A and 144A respectively). It should be understood that due to the absence of Resource 3 142 from Slice A 150, any traffic transmitted by Slice A 136A onto Connectivity Resource 140A will be delivered to Resource 4 146, and similarly any traffic transmitted from Slice 146A into Connectivity Resource 144A will be delivered to Slice A 136A. As such, within Slice A 150 Connectivity Resources 140A and 144A can be modelled as a single logical link 156. Logical link 158 is representative of the portion of Connectivity Resource 148 allocated to slice A 148A.

It should be understood that within the storage and computer resources illustrated in FIGS. 5 and 6, NFs can be instantiated using any of a number of known techniques, including network function virtualization (NFV), to create Virtual Network Functions (VNFs). While conventional telecommunications networks, including so-called Third Generation and Fourth Generation (3G/4G) networks, can be implemented using virtualized functions in their CNs, next generation networks, including so-called Fifth Generation (5G) networks, are expected to use NFV and other related technologies as fundamental building blocks in the design of a new CN and (R)AN. By using NFV, and technologies such as Software-Defined Networking (SDN), functions in a CN can be instantiated at a location in the network that is determined based on the needs of the network. It should be understood that if a network slice is created, the allocation of resources at different data centers allows for the instantiation of a function at or near a particular geographic location, even within the slice where resources have been abstracted. This allows virtualized functions to be "close" in a physical sense to the location at which they are used. This may be useful, and may combined with a sense of topological closeness to select a logical location at which to instantiate a function so that it is geographically or topologically close to a selected physical or network location.

Figure 7:
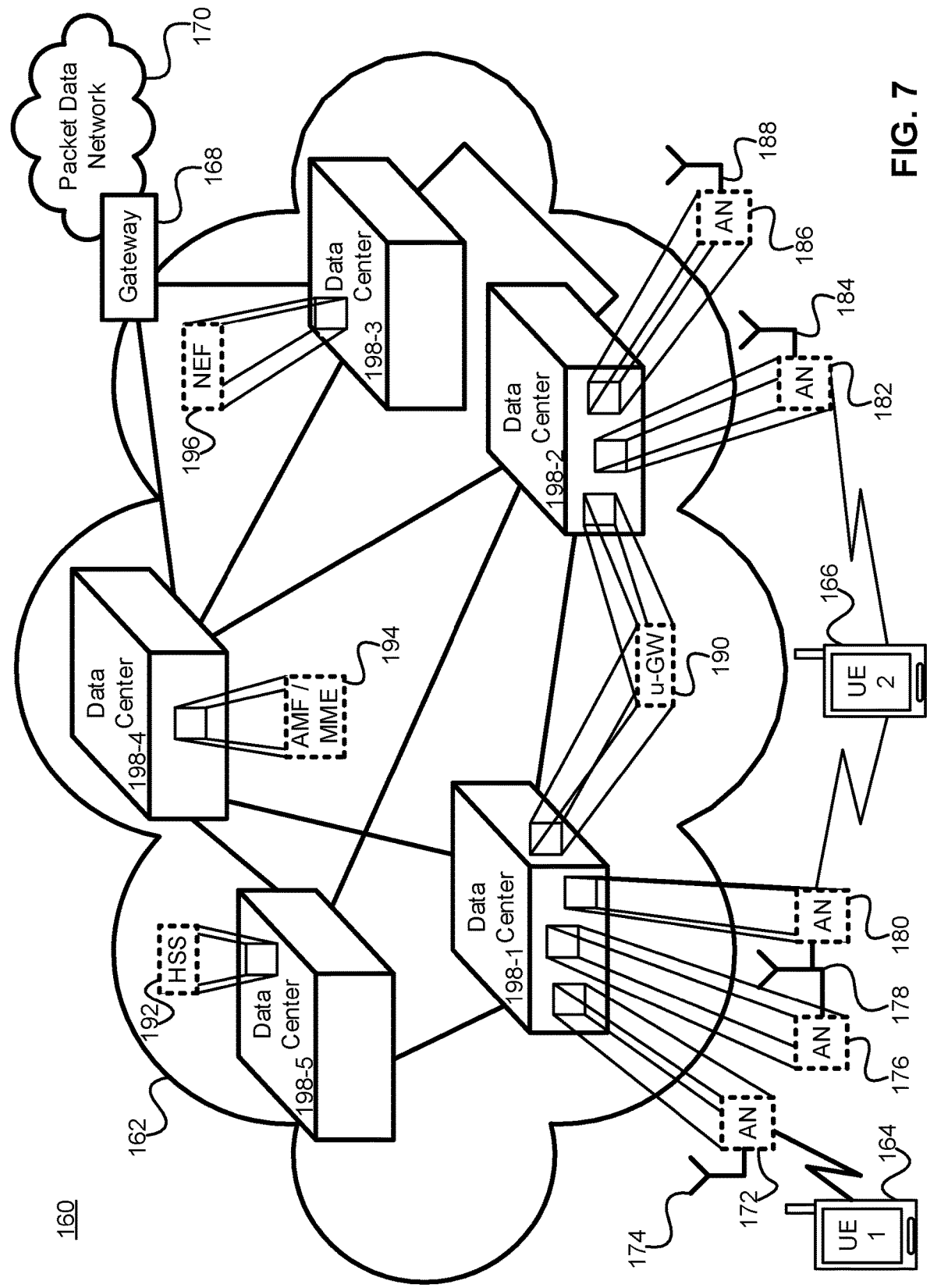
FIG. 7 is a diagram illustrating a cloud-based implementation of a Core Network and Radio Access Network using virtualized functions.

FIG. 7 illustrates a system 160 in which a core/(R)AN network 162 provides radio access and CN services to EDs 52 such as UE1 164 and UE2 166. In this figure, NFs are instantiated upon the underlying resources of a data center. The functions are shown as being exploded out of the pool of resources upon which they are instantiated. This is done to indicate that the functions act as independent entities and from a logical perspective they are indistinguishable from a physical node carrying out the same function. It should also be understood that in a sliced network where data centers provide the underlying resources upon which the slices are created, it is possible for a single network to have slices that support different versions of networks, so for example, in addition to having a virtualized network to support 5G traffic, a separate network slice can be created to support 4G networks. Traffic from EDs 52 can be routed through NFs, to a GW 168 that provide access to a packet data network 170 such as the Internet. Radio access services are typically provided by a (R)AN, which in this illustration is provided as a Cloud-(R)AN (C-(R)AN). Where a conventional (R)AN architecture was designed to be composed of discrete elements such as eNBs that were connected to the CN through a backhaul network, a C-(R)AN takes advantage of function virtualization to virtualize the Access Nodes (ANs) of the network. Much as a physical AN, such as an eNB, was connected to an antenna by a front haul link, in the illustrated embodiment of a C-(R)AN, ANs, such as a gNB are connected to an antenna (or to a remote radio head (RRH)) through a front haul connection, but are functions that are instantiated upon computer resources in network 162. If a gNB is divided into a CU and a plurality of DUs, the virtualized DUs may in some embodiments be instantiated at or near the location of the antenna or RRH, while a CU may be instantiated at a data center to connect and serve a plurality of geographically dispersed DUs. For example UE1 164 is connected to the network through AN 172, which can provide radio access services through antenna 174. AN 172 is instantiated upon the compute and storage resources provided by a data center, in this case data center 198-1. Similarly AN 176 and AN 180, which are connected to the same set of antennae 178, are also instantiated upon the resources of data center 198-1. AN 180 provides radio access services to UE2 166, which also makes use of the access services provided by AN 182. AN 182 is connected to antenna 184, and is instantiated upon the resources of data center 198-2. AN 186 is connected to antenna 188, and is also instantiated upon the resources of data center 198-2. It should be understood that the front haul connections linking the virtualized ANs to the antennas or RRHs, may be direct connections, or they may form a front haul network. The integration of a C-(R)AN into a CN may obviate or reduce the concerns associated with backhaul connections as the AN functions may be co-located with CN functions. As such, data center 198-1 also serves as a location at which a user-specific GW function (u-GVV) 190 is instantiated. This function is also instantiated in data center 198-2. Having a function instantiated at more than one data center may be part of a function migration processing which the function is moved through the network 162, or one of the instantiations may be an intentionally redundant instantiation. Both functions can be instantiated and configured, with only one of them active at a time, or they may both be active, but only one of them may be transmitting data to the UE. In other embodiments, such as those focussed on Ultra-Reliable connections, such as Ultra-Reliable Low Latency Communications (URLLC), both functions may be active and transmitting data to (or receiving data from) an ED such as UE2 166. NFs such as a HSS 192, an AMF 194, or its predecessor Mobility Management Entity (MME), and a NEF 196 are shown as being instantiated on the resources of data center 198-5, 198-4 and 198-3 respectively.

The virtualization of the NFs allows a function to be located in the network 162 at a location topologically close to the demand for the service provided by the function. Thus, AN 172, which is associated with antenna 174, can be instantiated upon data center resources at the data center closest to the antenna 174, in this case data center 198-1. Functions such as an NEF 196, which may not need to be close to ANs, may be instantiated further away (in either or both of a topological or physical sense). Thus, NEF 196 is instantiated at data center 198-3, and the HSS 192 and AMF 194 are instantiated at data centers 198-5 and 198-4 respectively, which are topologically closer to the radio edge of the network 162. In some network implementations, data centers can be arranged hierarchically and different functions can be placed a different levels in the hierarchy.

Figure 8:
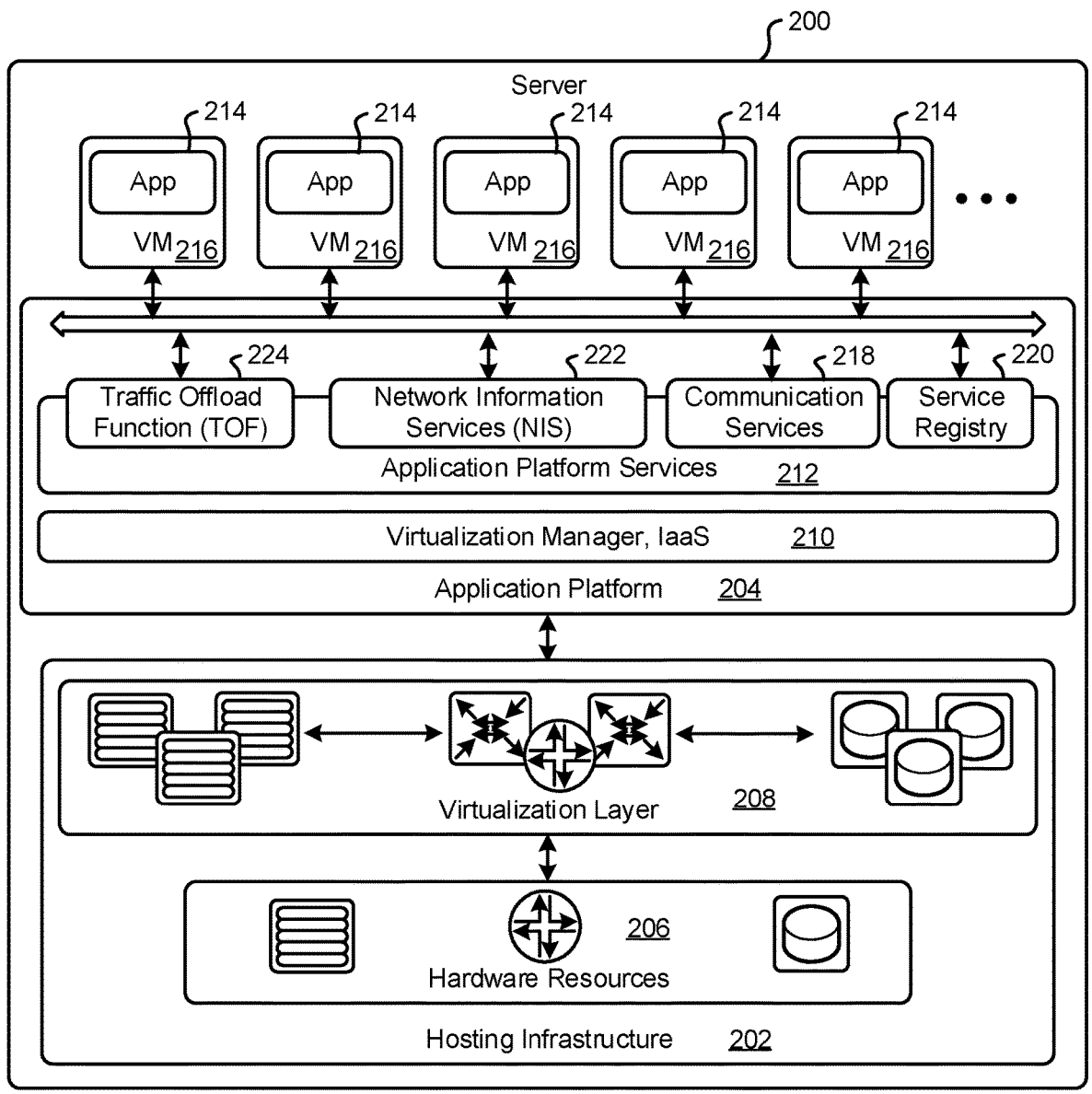
FIG. 8 is a block diagram illustrating a logical platform under which an ED can provide virtualization services.

FIG. 8 is a block diagram schematically illustrating an architecture of a representative server 200 useable in embodiments of the present disclosure. It is contemplated that the server 200 may be physically implemented as one or more computers, storage devices and routers (any or all of which may be constructed in accordance with the system 50 described above with reference to FIG. 1) interconnected together to form a local network or cluster, and executing suitable software to perform its intended functions. Those of ordinary skill will recognize that there are many suitable combinations of hardware and software that may be used for the purposes of the present disclosure, which are either known in the art or may be developed in the future. For this reason, a figure showing the physical server hardware is not included in this specification. Rather, the block diagram of FIG. 8 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 8, the illustrated server 200 generally comprises a hosting infrastructure 202 and an application platform 204. The hosting infrastructure 202 comprises the physical hardware resources 206, such as, for example, information processing, traffic forwarding and data storage resources) of the server 200, and virtualization layer 208 that presents an abstraction of the hardware resources 206 to the application platform 204. The specific details of this abstraction will depend on the requirements of the applications being hosted by the application layer (described below). Thus, for example, an application that provides traffic forwarding functions may be presented with an abstraction of the hardware resources 206 that simplifies the implementation of traffic forwarding policies in one or more routers. Similarly, an application that provides data stage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application 214 being hosted by the platform 204. Each "sandbox" may be implemented as a Virtual Machine (VM) image 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed with a respective VM 216. For example, MANagement and Orchestration (MANO) functions and Service Oriented Network Auto-Creation (SONAC) functions (or any of SDN, Software-Defined Topology (SDT), Software-Defined Protocol (SDP) and Software-Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application platform services 212 (through pre-defined Application Programming Interfaces (APIs) for example) and with each other (for example through a service-specific API).

A service registry 220 may provide visibility of the services available on the server 200. In addition, the service registry 220 may present service availability (eg. status of the service) together with the related interfaces and versions. This may be used by applications 214 to discover and locate the end-points for the services they require, and to publish their own service end-point for other applications 214 to use.

Mobile-edge Computing allows cloud application services to be hosted alongside virtualized mobile network elements in data centers that are used for supporting the processing requirements of the C-(R)AN. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load function (TOF) service 224 may prioritize traffic, and route selected, policy-based, user-data streams to and from applications 214. The TOF service 224 may be supplied to applications 214 in various ways, including: a pass-through mode where (either or both of uplink and downlink) traffic is passed to an application 214, which can monitor, modify or shape it and then send it back to the original Packet Data Network (PDN) connection (eg. a 3GPP bearer); and an End-point mode where the traffic is terminated by the application 214 that acts as a server.

The virtualization of NFs is considered to be a foundational technology for the architecture of flexible 5G networks. Function virtualization is a technology that allows for the creation of virtual functions on a base of compute, memory (which may include both executable memory and general storage) and connectivity or network resources. In many cases, these resources will exist within a data center. It should be understood that this discussion refers to resources instead of actual hardware because it is possible for virtualized resources to serve as the underlying resources for a next level of virtualization.

Virtualization may take the form of instantiating a virtual machine (VM) 216 that, to another entity on a network and to software executed on the VM 216, is no different than a physical node in the network. A VM 216 has its own set of compute, memory and network resources, upon which an operating system can be executed. The VM 216 can have a virtual network interface that can be assigned a network address. Between the underlying resources and the VM 216, there is typically a hypervisor that manages the resource isolation and network interactions. One of the purposes of a VM 216 is to provide isolation from other processes run on the system. When initially developed, a VM 216 was a mechanism to allow different network processors to operate without concern that a single errant process would be able to cause a complete system crash. Instead, an errant process would be contained to its own VM 216. This isolation allows for each VM 216 to have its own set of network interfaces. Typically, a single underlying resource can support a plurality of virtualized entities.

A more recent development has been the use of containers in place of VMs 216. Each VM 216 typically includes its own operating system, which typically increases redundant resource usage. Containers allow a single OS kernel to support a number of isolated virtual functions. In place of a hypervisor that allows each VM 216 to run its own OS, a single OS hosts containers that are responsible for enforcing the resource isolation that would otherwise be provided by the VM 216. Each virtualized function within in its own container can be provided a virtualized network interface so that it appears as its own network entity.

Figure 9:
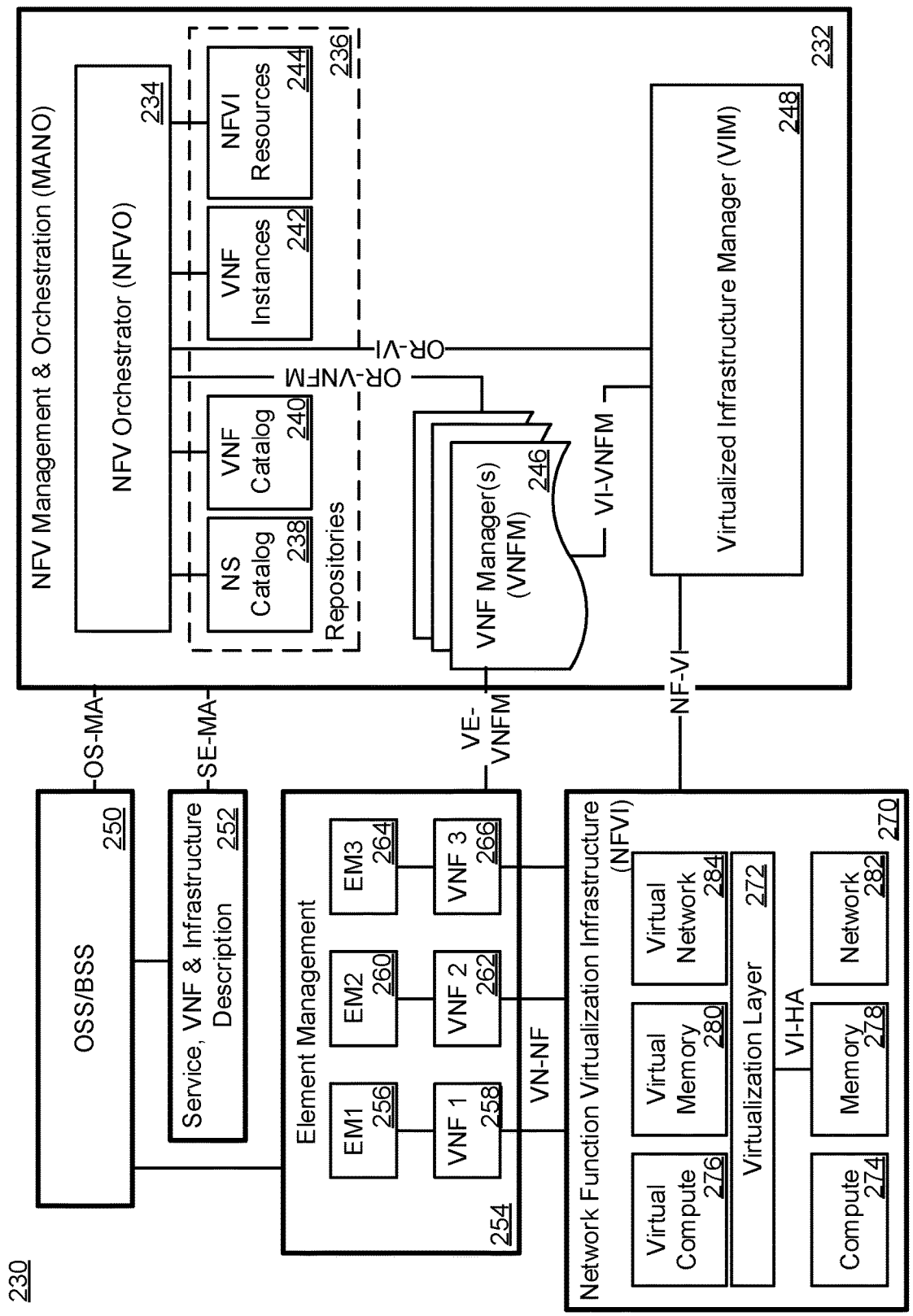
FIG. 9 is a block diagram illustrating an ETSI NFV MANO-compliant management and orchestration service.

With virtualization used in a networked environment, a question arises as to how the management of the instantiation, modification, and tear-down of virtualized functions is managed or orchestrated. To address this concern, the European Telecommunications Standards Institute (ETSI) has developed a set of standards for Network Function Virtualization (NFV) MANagement and Orchestration (MANO). As illustrated in FIG. 9, the NFV-MANO system allows for the management of NFV instantiation and modification. As illustrated, there can be interfaces to existing systems such as the Operation Support System (OSS)/Business Support Subsystem (BSS) 250. In network architecture 230, an NFV-MANO system 232 includes an orchestrator 234 which can access libraries 236 such as Newtork Service catalog 238, VNF Catalog 240, VNF Instances repository 242 and NFVI resources repository 244. The NS Catalog 238 may include templates that can be used as the basis for supporting network services. VNF catalog 240 may contain templates for the instantiation of different classes of VNFs. A particular VNF, after being instantiated, may be referred to as a VNF instance, and its attributes may be stored in VNF instances repository 242. NFVI resources 244 may be used to track the availability of resources, including both virtual resources and the physical infrastructure upon which they are instantiated. The NFVO 234 can be connected to a number of VNF Managers 246 through an OR-VNFM interface, and to a Virtualized Infrastructure Manager (VIM) 248 through a OR-VI interface. The VNFM 246 and VIM 248 can be connected to each other through a VI-VNFM interface.

The NFV MANO 232 can communicate with an OSS/a system 250 through OS-MA interface, and to a Service, VNF & Infrastructure description database 252 through an SE-MA interface. The Service, VNF & Infrastructure description database 252 can contain operator information about the services, VNFs and infrastructure deployed in the network. Service, VNF & Infrastructure description database 252 and OSS/BSS 250 can be connected to each other so that the OSS/BSS 250 can update and maintain the Service, VNF & Infrastructure description database 252 as needed.

NFVI 270 interacts with the VIM 28 through the NF-VI interface. Underlying resources can often be classified as compute resources 274, memory resources 278 and network resources 282. Memory resources 278 may also be referred to as storage resources, while network resources 282 may also be referred to as connectivity resources. A virtualization layer 272 allows for the abstraction of the underlying resources that it is connected to through a VI-HA interface. It should be understood that the underlying resources may be either physical or virtual resources. The Virtualization layer 272 allows for the abstraction of the underlying resources into virtual compute resources 276, virtual memory resources 280 and virtual network resources 284. These virtualized resources can be provided to the element management system 254 through the VN-NF interface so that they can be used as the resources upon which the VNFs (shown as VNF1 258, VNF2 262 and VNF3 266) can be instantiated. An element manager (EM) 254 can be connected to the VNFM 246 within NFV MANO 232 through interface VE-VNFM, and to the OSS/BSS 250 through another interface. Each VNF instantiated upon the virtual resources provided by NFVI 270 can be associated with an EM (EM1 256, EM2 260 and EM3 264). The use of an EM allows the OSS/BSS 250 to have two paths through which the VNFs can be managed. A VNF can be managed through the VNFM 246, or through the EM associated with the VNF. Each EM can provide the same management controls that it would otherwise provide for a physical network element. Thus, the OSS/BSS 250 can treat each VNF as a conventional NF. Modification to the resource allocation associated with a VNF can be requested by an EM through the VNFM 246, or through a request from the OSS/BSS 250 over the OS-MA interface.

The virtualization of NFs allows functions to be deployed with the resources that are required and not with an intentional over provisioning. In conjunction with the above-described slicing and data center utilization, flexible networks can be deployed in a manner that allows an operator to dynamically modify the connectivity between functions (thus changing the logical topology of the network) and to dynamically modify the resources and location of the NFs (thus changing the physical topology of the underlying network). Additional resources can be allocated to existing functions to allow for scaling-up of an existing function, and resources can be removed from an allocation to allow for a scaling-down of a function. Resources from more than one resource pool or data center can be allocated to a function so that it can be scaled-out, and resources from different pools can be removed to allow a function to be scaled-in. Functions can be moved by transferring their state information to another NF, and in some instances, a function can be moved through a combination of scaling-out and scaling-in functions.

Figure 10:
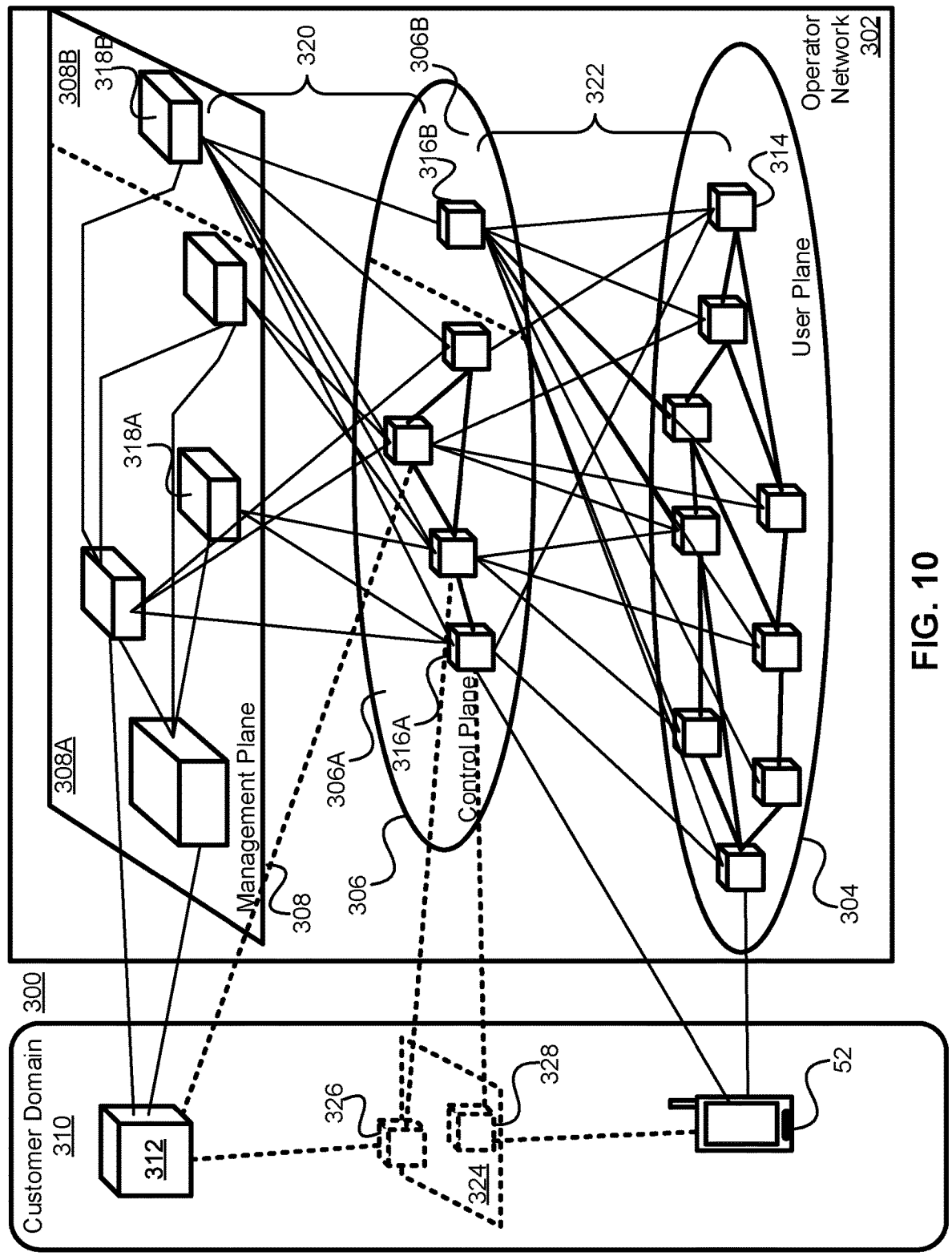
FIG. 10 is a diagram illustrating an embodiment of interactions between the Management Plane, Control Plane and User Plane of a network.

FIG. 10 illustrates a network architecture 300 in which the resources of the operator network 302 are divided into a set of logical planes, a UP 304, a CP 360 and a Management Plane (MP) 308. The UP 304 is typically focussed on packet transport, but certain functions including packet filtering and traffic shaping can be performed in the UP 304, although this is typically performed based on instructions from a NF in the CP 306. Functions in the MP 308 receive input from NFs within the customer domain 310 about the policies that should be enforced by the network control functions in the CP 306. If Operator Network 302 supports network slicing, functions within MP 308 may be responsible for slice design and creation. It should be understood that a single MP 308 may be used to provide management functionality for a plurality of network slices that each have different control and user planes. Functions within the MP 308 can communicate with each other to ensure that the differing policies for a possible plurality of customers are fitted together in a suitable set of instructions.

UP 304 may also be referred to as a data plane (DP). It carries the traffic between an ED 52 and other external data networks (not shown) or functions within the operator network 302. UP 304 is typically composed of UP Functions (UPFs) 314. In some instances, a UPF 314 may be specific to a particular UE, it may be specific to a particular service (in some embodiments, it may be both user and service specific), and in other instances it may be a generic function serving a plurality of users and services. UPFs 314 are connected to each other to allow for DP traffic to be transmitted.

The CP 306 may be composed of CP Functions (CPFs) 316. In a 3GPP compliant network, some CPFs 316A have functions defined by standards, while other CPFS 316B may be outside the specification of the relevant standards. This may effectively result in the CP 306 being divided into a standards-compliant CP segment 306A and a non-standards compliant CP segment 306B. In a 3GPP-compliant CP segment 306A, NFs 316A such as an AMF, SMF, NEF, AUSF, etc. may be present, and in some embodiments more than one instance of any or all of the functions may be present. In a non-standards compliant CP segment 308B, a NF 316B such as an SDN Controller, or other such controllers including a SONAC-OPS controller, may be connected to other CPFs, as shown by functions 316A, but this is not necessarily required as may be seen by CPF 316B. ED 52 may also communicate with CPFs.

The Management Plane 308 can be divided between a standards-compliant section 308A and a non-standards compliant section 308B, much as CP 306 is divided. Within MP 308, NFs and nodes 318 can communicate with each other, and with a NF or node 312 within the customer domain 310. MP entities 318A (within the standardized section 308A) and 318B (within the non-standards compliant section 308B) can be used to establish policy, and the mechanisms by which policy is to be enforced, based on the resources available and requirements received from the customer 312 (and possibly a plurality of different customers). Network Management Functions (NFMs) 318 may be responsible for accounting and billing functions for element management, they may provide the services required for an OSS and a BSS. Outside the standardized functions, non-standardized NFs 318B may include an NFV-MANO system and a SONAC-Com controller.

NMFs 318 can receive external input from a customer node 312, and can communicate with each other. NMFs 318 can also communicate, over any of the MP-CP connections 320, with CPFs 316 to provide instructions about the policies to be enforced by CPFs 316. Changes in the resources underlying the network 302 are also communicated by a NFM 318 to CPFs 316. In CP 306, CPFs communicate with each other, and with ED 52. CPFs 316 are also in communication with UPFs 314, and through this communication they can receive information such as traffic loads on links and processing loads at NFs. In conjunction with policy information received from NMFs 318, a CPF 316 can transmit instructions to the UPFs 314, over the CP-UP (also referred to as UP-CP) connections 322, to govern the behaviour of the UPFs 314. A UPF 314 receives configuration information from a CPF 318, and handles UP traffic in accordance with the received configuration information. Loading information (which may include both processing and network connection (or link) loading) may be gathered by a UPF 314 and provided to a CPF 316.

In some embodiments, the customer NF 312 may have a connection to a CPF 316. This CPF 316 with which customer NF 312 communicates, may be either a 3GPP-compliant CPF 316A or a non-3GPP compliant CPF 316B. In alternate embodiments, the customer NF 312 may make use of a function within MP 308 to relay messages to functions in CP 306. Within the customer domain 310, there may be an optional CP 324, with customer CPFs 326 and 328. When such a customer CP 324 is present, functions 326 and 328 may have logical communications links with either or both of ED 52 and the customer NF 312. Customer CP functions 326 and 328 may have connections to functions within CP 306 (either 3GPP-compliant functions 316A or non-3GPP compliant functions 316B).

NSI Specification

Figure 31:
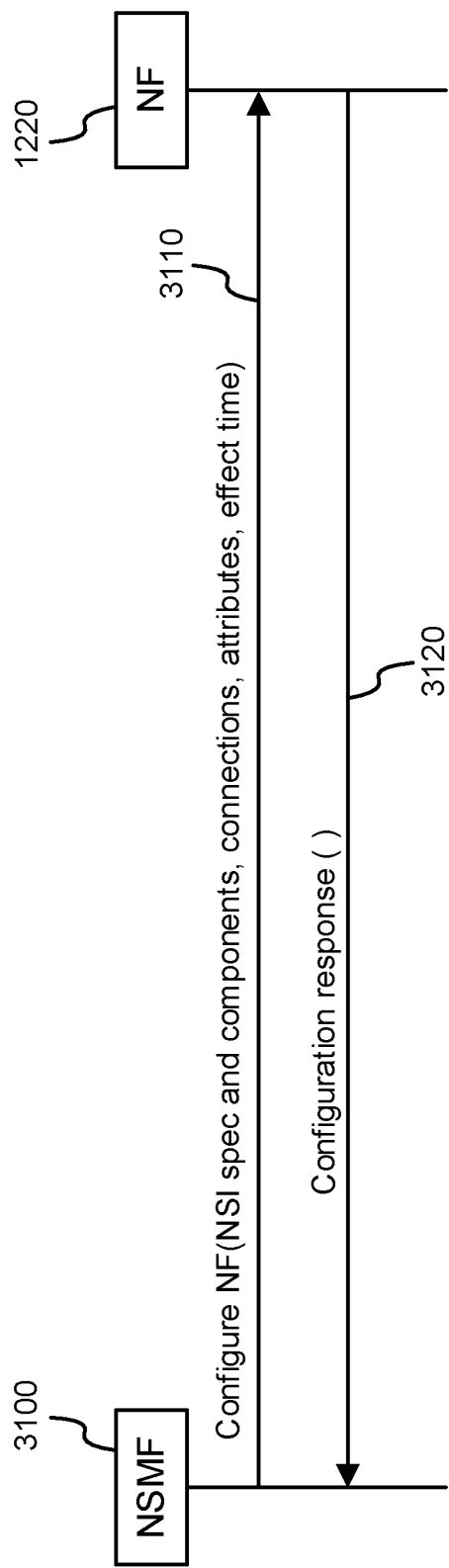
FIG. 31 is a signal flow diagram showing example signal flows for an NSMF to directly configure and/or deploy an NSI specification to a directly-coupled NF of the NSI according to an example.

In some examples, an NSI management function (NSMF), also known as an NSI development/deployment function (NSDF) 3100 (FIG. 31) may be a management plane function (MPF) and responsible for developing and defining an NSI specification for a given NSI 1210 (FIG. 12) and deploying the NSI specification to constituent CPFs 316 of the given NSI 1210.

In some examples, the NSI specification can be presented as an information model, such as is shown, by way of non-limiting example, in any of FIGS. 11, 12, 14 and 18. In some examples, the NSI specification is only used to describe the NF and related topology attributes.

Figure 11:
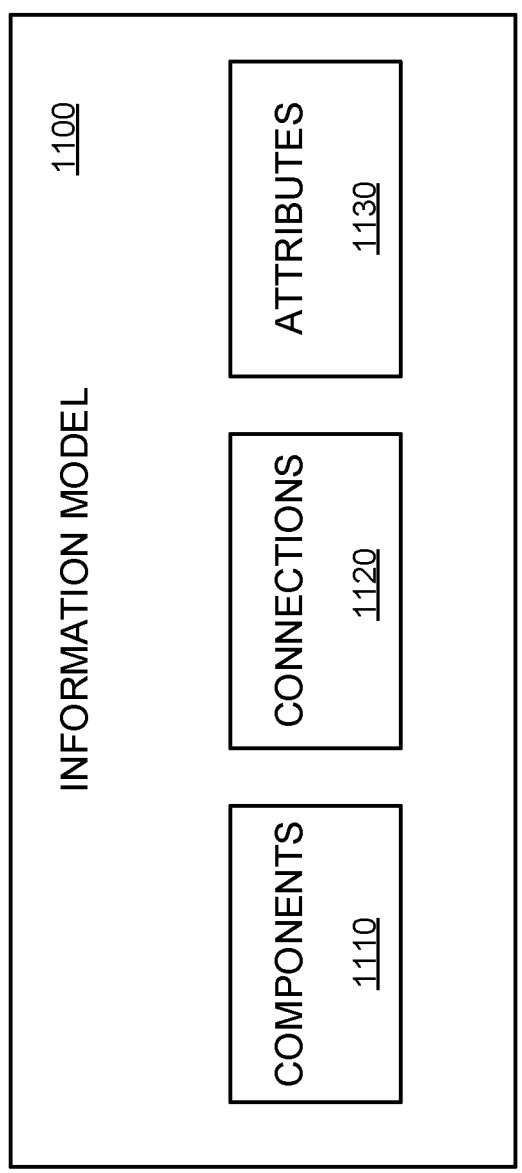
FIG. 11 is a simplified block diagram showing elements of an information model according to an example.

In some examples, the NSMF 3100 may employ an underlying information model 1100 (FIG. 11), 1200 (FIG. 12), 1400 (FIG. 14) that breaks down a network slice 1210 (FIG. 12) into varying combinations of elements. For example, FIG. 11 shows a simplified block diagram showing elements of an information model 1100.

The information model 1100 has three element types, namely components 1110, connections 1120 thereto and attributes 1130 thereof. Components 1110 identify the NFs 1220 (FIG. 12) and network slice subnets (NSSes) 1230, 1240 (FIG. 12) that make up an NSI 1210. If not inherent in the identification of the NF 1220, the component element 1110 also identifies the functionality provided by each NF 1220. Connections 1120 identify the topology (in terms of interconnections and/or location) of the identified NFs 1220 and NFs within open NSSes 1230 and closed NSSes 1240. Attributes 1130 identify the capabilities that describe the NFs 1220 open NSSes 1230, closed NSSes 1240 and NFs within open NSSes 1230 and closed NSSes 1240.

The information model 1100 comprising the combination of these three elements 1110, 1120, 1130 in various combinations and permutations permits a complete description by the NSMF 3100 or other management entity of a network slice 1210 (or segments thereof that can be combined into an E2E network slice) and facilitates configuration of the network slice (segments) 1210.

Figure 12:
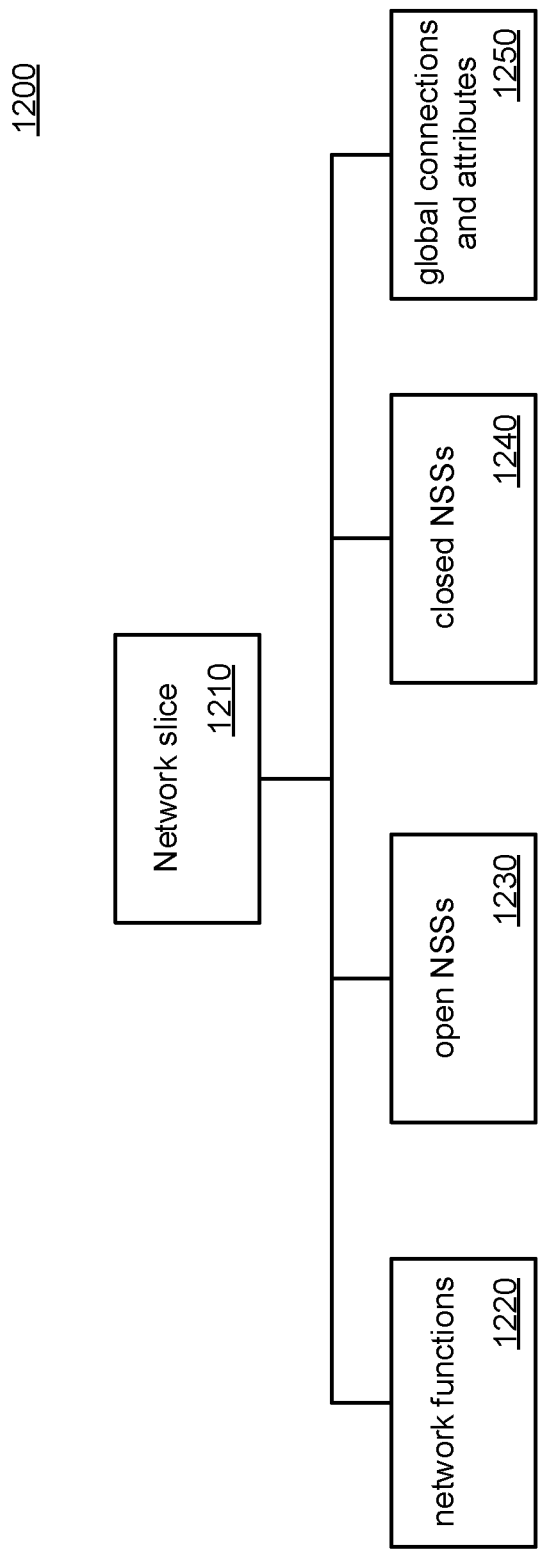
FIG. 12 is a block diagram showing use of components, connections and attributes in various combinations in an information model to describe an NSI according to an example.

FIG. 12 is a more detailed block diagram showing how the various elements of the information model 1100, namely components 1110, connections 1120 and attributes 1130, can be combined to provide an information model, shown generally at 1200, of an example NSI 1210.

The information model 1200 shows that the NSI (segment) 1210 comprises and identifies three broad types of components, namely directly-coupled NFs 1220, open NSSes 1230 and closed NSSes 1240. In addition, the information model 1200 comprises a plurality of global connections and/or attributes 1250 that relate to the NSI 1210 as a whole, including without limitation, its component NFs 1220.

An identified NF 1220 is an atomic component. The identified NFs 1220 are directly-coupled within the NSI 1210 by the NSMF 3100 and as such are distinguishable from NFs 1620 (FIG. 16), 1710, 1720 (FIG. 17) that form part of an NSS 1230, 1240.

The NSS 1230, 1240 is a component that comprises a plurality of identified NFs 1620, 1710, 1720 therein. An instance of an NSS 1230, 1240 may, in some embodiments, be known as an NSS instance (NSSI) 1230, 1240. In some examples, an NSSI 1230, 1240 may have an associated NSSI specification. In some examples, the NSI specification 1210 may be prepared by combining the NSSI specification of constituent NSSIs 1230, 1240 with additional attributes as appropriate.

In some examples, a higher-order NSS 1230, 1240 may also comprise one or more lower-order NSSes 1230, 1240. An NSS 1230, 1240 may be considered to be open or closed from the perspective of the NSMF 3100, depending upon whether information (in the form of components 1110, connections 1120 thereto and/or attributes 1130 thereof) about the NSS 1230, 1240 is visible or not to the NSMF 3100. The information about an open NSS 1230 is visible by the NSMF 3100 while the information about a closed NSS 1240 is not visible to the NSMF 3100. Instead, the information about a closed NSS 1240 that is not visible to the NSFM 3100 is represented by an associated abstracted information objective class (IOC) (not shown).

Typically, a 3GPP NSS 1230 may be considered to be open, while a non-3GPP NSS 1240 may be considered to be closed. However, it is conceivable that in some scenarios, a 3GPP NSS 1230 will be considered closed and/or that a non-3GPP NSS 1240 will be considered open.

The NSI specification encompasses an NF attribute description. The NF attribute description identifies each NF 1220 that is to be deployed in the network slice 1210 and describes attributes of each identified NF 1220.

The identification of an NF 1220 in the NF attribute description may comprise an NF identifier 1301 (FIG. 13). In some examples, the NF identifier 1301 may be an alphabetic, numeric, alpha-numeric or other identifier. In some examples, the NF identifier 1301 may also include the type of NF 1220 as described below or an identifier representative thereof. In some examples, the identification of an NF 1220 may comprise additional indicia.

The description of the attributes of each NF 1220 identified in the NF attribute description specifies the type of NF 1220, the function provided by the NF 1220, the location of the NF 1220 and the capabilities of the NF 1220. In some examples, the description of the attributes of each NF 1220 may comprise additional indicia.

The NF 1220 may be one of several broad types, including, without limitation, a UPF 86, a CPF 316 and/or a customer-defined AF 104 or MEC function 2410 (FIG. 24).

The function provided by the NF 1220 may depend upon the type of the NF 1220. By way of non-limiting example, a UPF 86 may serve as an aggregator, packet dispenser, point-to-point virtual router, point-to-multipoint virtual router and/or mobility anchor and/or gateway (GW) 168.

By way of non-limiting example, a CPF 316 may provide an end-to-end device SMF 92, location tracing/resolution management function, AMF 90, AUSF 94, NEF 96, NRF 98, PCF 100, UDM function 102 and/or AF 104.

The location of the NF 1220 may be specified, without limitation, in terms of its physical location information and/or its relative location. Physical location information may include without limitation, the physical location of the PoP on which the NF 1220 is to be instantiated, the radio network node (NN) ID, the IP address and/or the cloud ID or address. Relative location information may include, without limitation, the identifier of one of several tracking areas into which a radio NN can be divided for purposes of tracking EDs 52, the identifier of one of several clusters into which a (R)AN can be divided for control and/or management purposes and/or the identifier of one of several zones in which a network can be divided for control and/or management purposes.

The capabilities of the NF 1220 may be specified, without limitation, in terms of the processing capacity (in terms of bits per second) of the NF 1220.

In some examples, the NF attribute description may be represented by an NF attribute description table such as is shown by FIG. 13. Those having ordinary skill in the relevant art will appreciate that the NF attribute description may be represented diagrammatically or otherwise and in manners other than the NF attribute description table of FIG. 13. By way of non-limiting examples, the NF attribute description may comprise a text description, a computer data structure or other suitable description.

In such an NF attribute description table, shown generally at 1300, each row 1310 or column 1320 (in the figure, row 1310) represents one of the identified NFs 1220 or NFs in NSSs 1230 and 1240 and the other of the columns 1320 or rows 1310 (in the figure, columns 1320) specify the attributes of each NF 1220 or NFs in NSSs 1230 and 1240. In some examples, the number, order or type of columns 1320 may be different than that shown in the figure.

By way of non-limiting example, one column 1321 specifies the NF identifier 1301. In the figure, the NF identifier 1301 is denoted by an indication of the type 1303 of the NF (UPF 86/CPF 316/MEC 2410) and a numeric identifier separated by a hyphen.

By way of non-limiting example, one column 1322 specifies the function served by (or name 1302 of) the NF 1220.

By way of non-limiting example, one column 1323 specifies the type 1303 of the NF (UPF 86/CPF 316/MEC). In some examples, especially if the NF identifier 1301 indicates the type 1303 of NF 1220, the column 1323 may be omitted.

By way of non-limiting example, one column 1324 specifies the physical location 1304 of the NF 1220.

By way of non-limiting example, one column 1325 specifies the process capability 1305 of the NF 1220.

By way of non-limiting example, one column 1326 specifies the relative location identifier 1306 associated with the NF 1220.

In some examples, the specification also encompasses an NSI topology description. An NSI 1210 that does not include an NSI topology description but comprises only an NSI attribute description is said to be a loosely defined NSI 2400 (FIG. 24).

Figure 14:
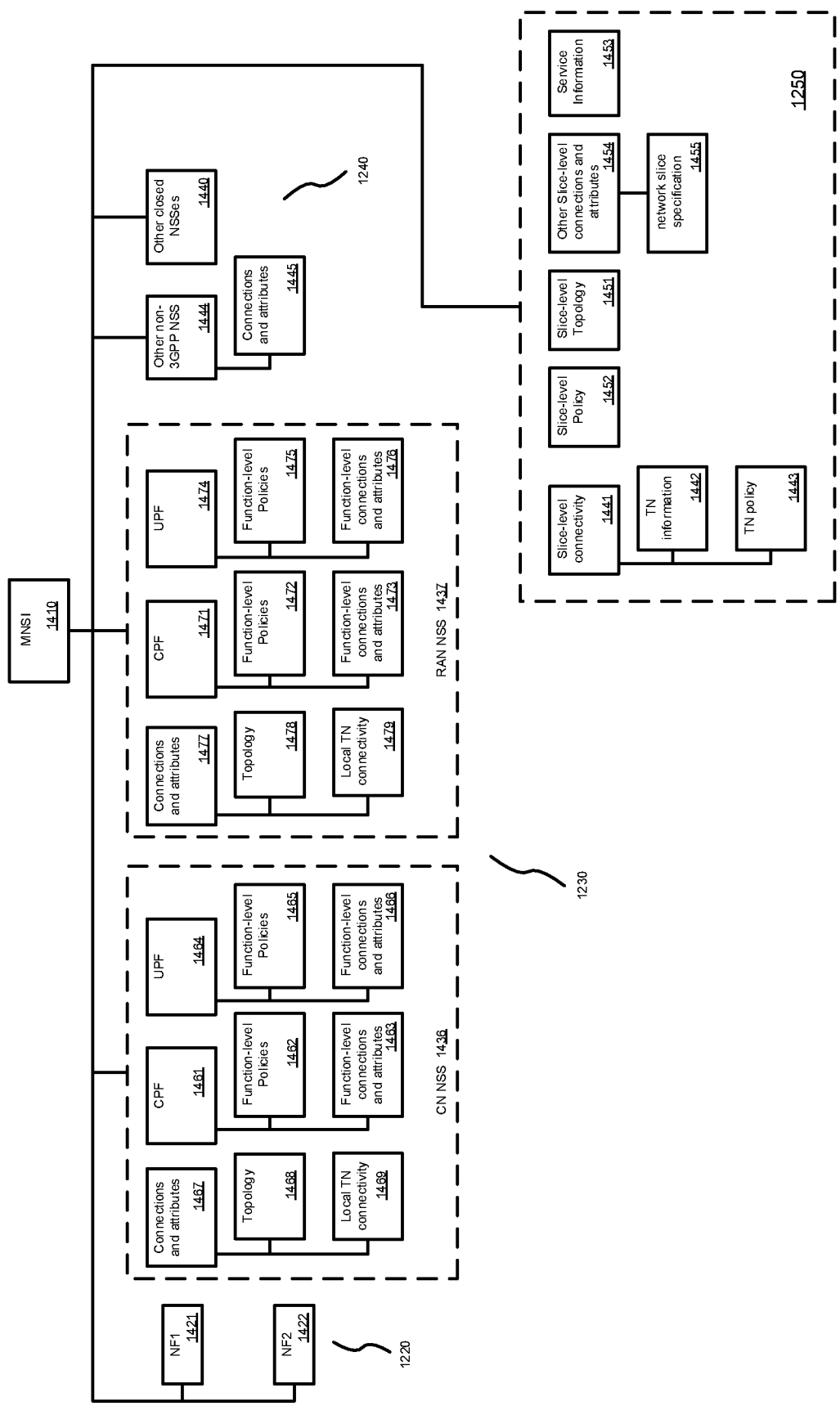
FIG. 14 is a block diagram showing an example information model for an example NSI.

FIG. 14 is a block diagram of an example information model 1400 that shows greater detail than FIG. 12 for the NSI 1210. In particular, it identifies two example directly-coupled NFs 1220, designated NF1 1421 and NF2 1422, two open NSSes 1230, designated a CN NSS 1436 and a (R)AN NSS 1437 and a plurality of closed NSSes 1240, exemplified by other non-3GPP NSS(es) 1444, which may include without limitation, a data centre network (DCN) NSS (not shown) and/or other closed NSS(es) 1440.

Within CN NSS 1436, it may be seen that components 1110 thereof may comprise a combination of CPFs 1461 and/or UPFs 1464. Similarly, within (R)AN NSS 1437, it may be seen that components 1110 thereof may comprise a combination of CPFs 1471 and/or UPFs 1474.

Because the closed NSSes 1240 have limited or no visibility, there may be only limited visibility of the components 1110 thereof. In FIG. 14, no components 1110 are shown in either slice-level connectivity 1441, other non-3GPP NSS(es) 1444 or other closed NSS(es) 1440.

Furthermore, FIG. 14 provides greater details regarding the global connections and attributes 1250. Connections 1120 corresponding to the global connections and attributes 1250 relate to the NSI 1210 as a whole and/or to the directly-coupled NFs 1220 thereof and may include, by way of non-limiting example, a slice-level connectivity 1441, TN information 1442, TN policy 1443 and/or a slice-level topology 1451.

The slice-level connectivity 1441 describes connectivity provided by the transport network (TN) coupling components 1110 of the information model 1400, such as NFs 1220 (including without limitation NF1 1421, NF2 1422), open NSSes 1230 (including without limitation CN NSS 1436, (R)AN NSS 1437) and closed NSSes 1240 (including without limitation other non-3GPP NSS 1444 and other closed NSSes 1440). The TN information 1442 provides information relating to the TN and the TN policy 1443 provides information relating to policies governing the TN.

The slice-level topology 1451 identifies physical location information of each NF 1220 and NSS 1230, 1240 in the NSI (segment) 1210 and in some examples, the control links and/or logical connections coupling pairs of NFs 1220, 1620, 1710, 1720. In some examples, physical location information may include, without limitation, the physical location of the PoP on which the NF 1220 is to be instantiated, the radio network node (NN) ID, the IP address and/or the cloud ID or address. In some examples, the slice-level topology 1451 also describes relative location information, which may include, without limitation, the identifiers of one of several tracking areas into which a radio NN can be divided for purposes of tracking EDs 52, the identifier of one of several clusters into which a (R)AN 84 can be divided for control and/or management purposes and/or the identifier of one of several zones into which a network can be divided for control and/or management purposes. In some examples, the slice-level topology 1451 (or a relevant portion thereof) may form part of a network slice specification 1455.

Additionally, service function chains (SFC) 1854 (FIG. 18) associated with the various service(s) provided by a NSI 1210 may be considered connections 1120. A given service may have one or more flows associated with it that may be processed by different CPFs 316 and/or UPFs 86 or service functions in a different combination or SFC 1854 than data of the service. By way of non-limiting example, the message signalling of a service may employ a different SFC 1854 than the data processed by the service.

Figure 15:
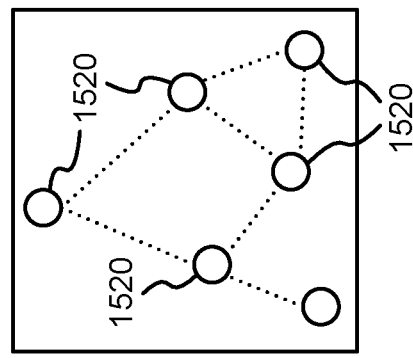
FIG. 15 is a diagram showing a plurality of directly-coupled NFs without specification of a service function chain.

An SMF 1854 at the NSI 1210 level may comprise a plurality of directly-coupled NFs 1220. This is shown in FIG. 15, in which the NFs 1220 are visible but an SFC 1854 is not defined a priori so that the NSMF 3100 is free to specify an appropriate SFC 1854. Under the current 3GPP standard, the responsibility for allocating the user plane paths through the SFC 1854 is assigned to the SMF 92.

An NSS 1230, 1240 may comprise one or more SFCs 1854 comprising a plurality of NFs 1620, 1710, 1720. Such SFCs 1854 may be specified by a network slice subnet management function (NSSMF) 3203 (FIG. 32) that acts as a management entity for the NSS 1230, 1240 in a manner comparable to the NSMF 3100 for the NSI 1210.

Figure 16:
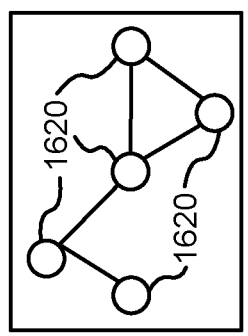
FIG. 16 is a diagram showing a service function chain of NFs within an open NSS.

An example of an open NSS 1230 is shown in FIG. 16, in which the NFs 1620 are shown as part of the SFC(s) 1854 specified by the NSSMF 3203 of the open NSS 1230. The SFC(s) 1854 are not subject to alteration by the NSMF 3100. However, the SFCs 1854 specified by the NSSMF 3203 for the open NSS 1230 are visible to the NSMF 3100.

Figure 17:
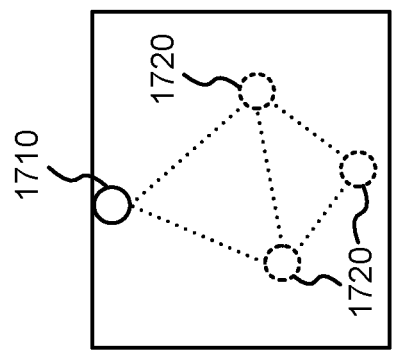
FIG. 17 is a diagram showing an entry/egress point for a closed NSS without visibility of a service function chain contained therein.

An example of a closed NSS 1240 is shown in FIG. 17 in which the NFs 1710, 1720 are shown as part of the SFC(s) 1854 specified by the NSSMF 3203 of the closed NSS 1240. Here, however, neither the NFs 1720 (except for an entry/egress NF 1710) nor the SFC(s) 1854 are visible to the NSMF 3100 and the SFC(s) 1854 are not subject to alteration by the NSMF 3100. Rather, the entry/egress point 1710 may be identified in the IOC. In some examples, the NSMF 3100 may inform NSSMF 3203 for the closed NSS 1240 if a specific SFC 1854 should be employed for a given service and/or flow. However, beyond this, the NSMF 3100 has no control over, nor any visibility into the closed NSS 1240.

In addition, within CN NSS 1436, there is shown an NSS-specific collection 1467 of connections 1120 and attributes 1130. Connections 1120 corresponding thereto include a CN NSS topology 1468 and a local transport network (TN) connectivity 1469. Similarly, within (R)AN NSS 1437, there is shown an NSS-specific collection 1477 of connections 1120 and attributes 1130. Connections 1120 corresponding thereto include a (R)AN NSS topology 1478 and a local TN connectivity 1479.

In some examples, the level of visibility of an NSS 1230, 1240 may vary along a range of visibilities. By way of non-limiting example, an open (R)AN NSS 1437 may be represented by a gNB with two NFs, one gNB controller, one gNB data plane gateway for facilitation of the slice. In such example, the NSSMF 3203 associated with the (R)AN NSS 1437 may only know the locations, capabilities and usage specifications of the gNB controller and the data plane gateway. The capabilities may include geographical information such as service area and/or service functionalities with actual resources and/or a representative capability/functionality in providing a service. In some examples, an SFC 1854 that specifies an actual order in which the functionalities are carried out may be visible. In some examples, the visibility may include a specific type of base station with a given capacity and/or a data rate that can be provided by an access node.

Attributes 1130 corresponding to the global connections and attributes 1250 relate to the NSI 1210 as a whole and/or to the directly-coupled NFs 1220 thereof and may include, by way of non-limiting example, a slice-level policy 1452, service information 1453 and/or other slice-level attributes 1454 (which may include a network slice specification 1455).

The slice-level policy 1452 identifies attributes including without limitation a priority associated with each slice.

The service information 1453 identifies attributes including without limitation, identification of the service, demands of the service, service areas and/or user distribution.

The network slice specification 1454 identifies each component 1110 of the NSI 1210 that relates to one or more given service(s) subscribed to by a customer for use by one or more end-users, and describes the attributes associated therewith. In some examples, the network slice specification 1454 may also identify the physical and/or relative location information of nodes in SFC(s) 1854 associated with such service(s).

In addition, a given NSS 1230, 1240 may have one or more attributes 1130 specific to the NSS 1230, 1240 itself. In the case of an open NSS 1230, such as CN NSS 1436 and/or (R)AN NSS 1437, the attributes 1130 relevant thereto may be completely visible. By way of non-limiting example, in FIG. 14, within CN NSS 1436, there may be attributes 1130 as part of the NSS-specific collection 1467 of connections 1120 and attributes 1130, although none are shown in the figure. However, one or more of the CPFs 1461 may have associated therewith attributes 1130, including, without limitation, function-level policies 1462 and/or function-level connections and attributes 1463 and one or more of the UPFs 1464 may have associated therewith, attributes 1130, including, without limitation, function-level policies 1465 and/or function-level connections and attributes 1466. In some examples, function-level policies 1452, 1465 may include without limitation, a priority of the sessions passing through an NF 1220, a preference of such sessions and/or a charging policy for such sessions. In some examples, attributes of function-level connections and attributes 1463, 1466 may include without limitation, the capacity of links coupling NFs 1220, security information of such links and/or the topology of NFs 1220 within an NSS 1230, 1240.

Similarly, within (R)AN NSS 1437, there may be attributes 1130 as part of the NSS-specific collection 1477 of connections 1120 and attributes 1130, although none are shown in FIG. 14. However, one or more of the CPFs 1471 may have associated therewith attributes 1130, including, without limitation, function-level policies 1472 and/or function-level connections and attributes 1473 and one or more of the UPFs 1474 may have associated therewith, attributes 1130, including, without limitation, function-level policies 1475 and/or function-level connections and attributes 1476.

In the case of a closed NSS 1240, the management entity may not have complete visibility into the attributes thereof. Nevertheless, some attributes 1130 may be selectively made visible. By way of non-limiting example, in FIG. 14, there are shown attributes 1130 such as TN information 1442 and TN policy 1443 within the slice-level connectivity NSS 1446, and certain connections 1120 and attributes 1130 (collectively 1445) associated with the other non-3GPP NSS(es) 1444.

Figure 18:
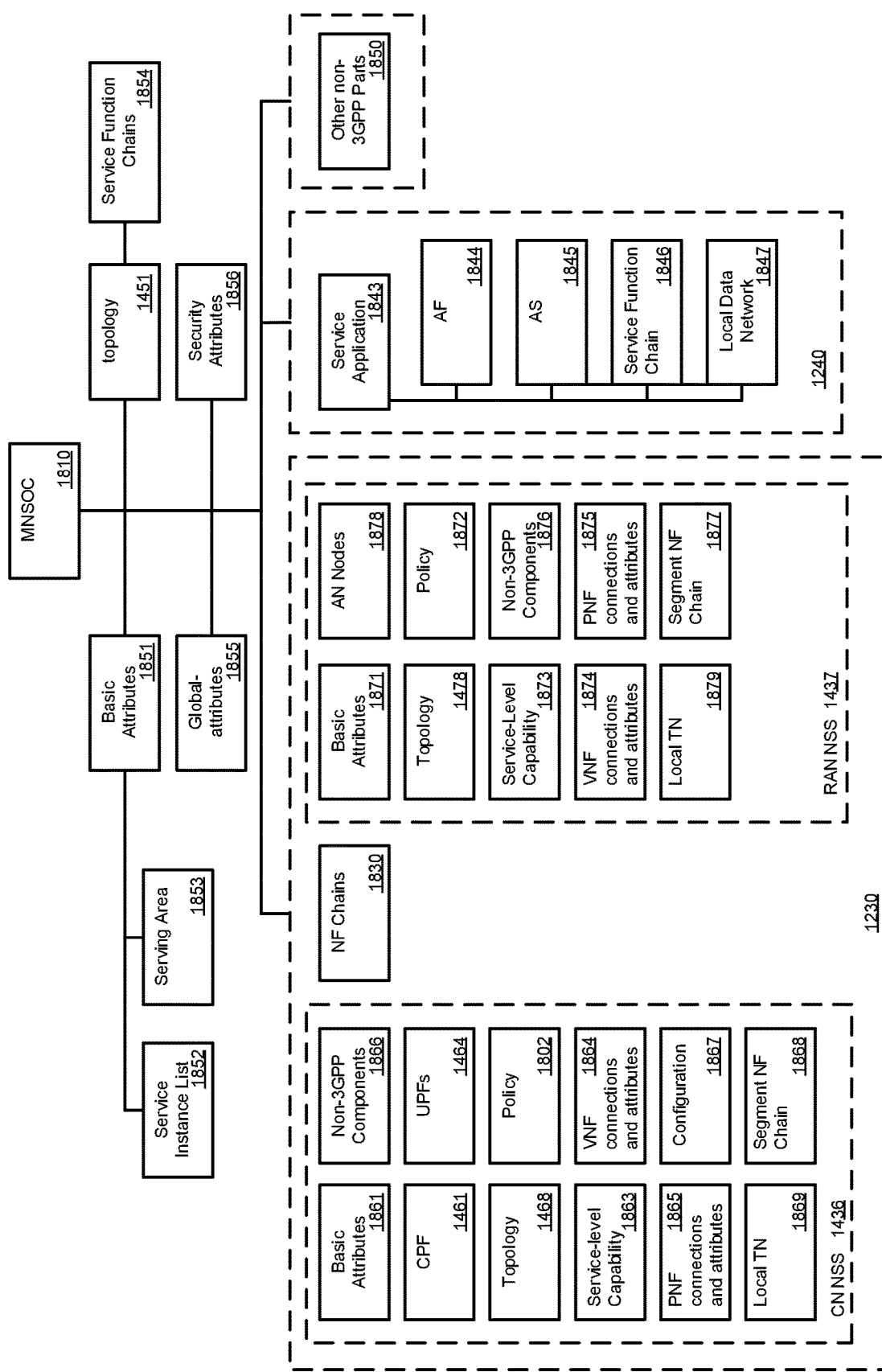
FIG. 18 is a block diagram showing an example managed network slice object class for an example NSI.

Turning now to FIG. 18, there is shown a block diagram of an example managed network slice object class (MN-SOC) 1810 for an example NSI 1210.

In some examples, one NF chain will map to one flow of traffic. A session or communication service may have multiple flows with different function chains.

Thus, it may be seen that the structure of a given NSI 1210 may be specified by a combination of one or more components 1110, connections 1120 therebetween and attributes 1130 thereof.

In order to configure an NSI 1210 to support one or more customer service(s) for use by one or more of the customer's end-users, the NFs 1220 (or CPFs 316 thereof) relevant thereto are configured by the NSMF 3100 and for each NSS 1230, 1240, the NFs 1620, 1720 (or CPFs 316 thereof) are configured, under direction of the NSMF 3100, by the relevant NSSMF 3203 thereof.

According to an example, such configuration may be direct. According to an example, such configuration may be indirect. Examples of both direct and indirect configuration of the directly-coupled NFs 1220, the NFs 1620 in open NSSes 1230 and the NFs 1710, 1720 in closed NSSes 1240 are described with reference to FIGS. 32-34, 36-38.

When creating an NSI 1210, the components of the NSSIs 1230, 1240 should be configured to complete the creation of the NSI 1210. The management system managing the NSSI 1230, 1240 should also be given with all the information to configure the network components (e.g. applicable NFs 1220) belong to NSSIs 1230, 1240. The configurations of these components can include:

Service/slice differentiation information: required information to differentiate the traffic of various services and NSIs 1210 if the component are shared;

Functionality selection information: information on the selection of required functionalities of NFs 1220 (e.g., AMF 90) according to the types of service provided by this NSI 1210 and requirements of this NSI 1210;

Connection information: the logical link information for the NFs 1220 (e.g., UPF 86) to communicate with appropriate NFs 1220 and NSSIs 1230, 1240 (e.g. CN, (R)AN subnets) belong to the NSI 1210;

Operation information: the required information for the operation of the NF 1220 (e.g., UPF 86 topology for the SMF 92);

The basic attributes 1851, global attributes 1855 and/or security attributes 1856 may be applicable to any and/or all the NFs 1220 and/or NSSes 1230, 1240. In some examples, such basic attributes, 1851, global attributes 1855 and/or security attributes may be applicable to the other non-3GPP parts 1850. In some examples, the security attributes 1856 may contain multiple levels that may be adopted for different slice components or scenarios. The corresponding information can be given by the slice specification 1300 and/or directly in a corresponding information model.

NOTE 1: the list of information above is not exhaustive.

NOTE 2: the list of information above is not all necessary for an NSI 1210 configured by a 3GPP management system, related configuration requirements should be sent to corresponding management systems.

Figure 32:
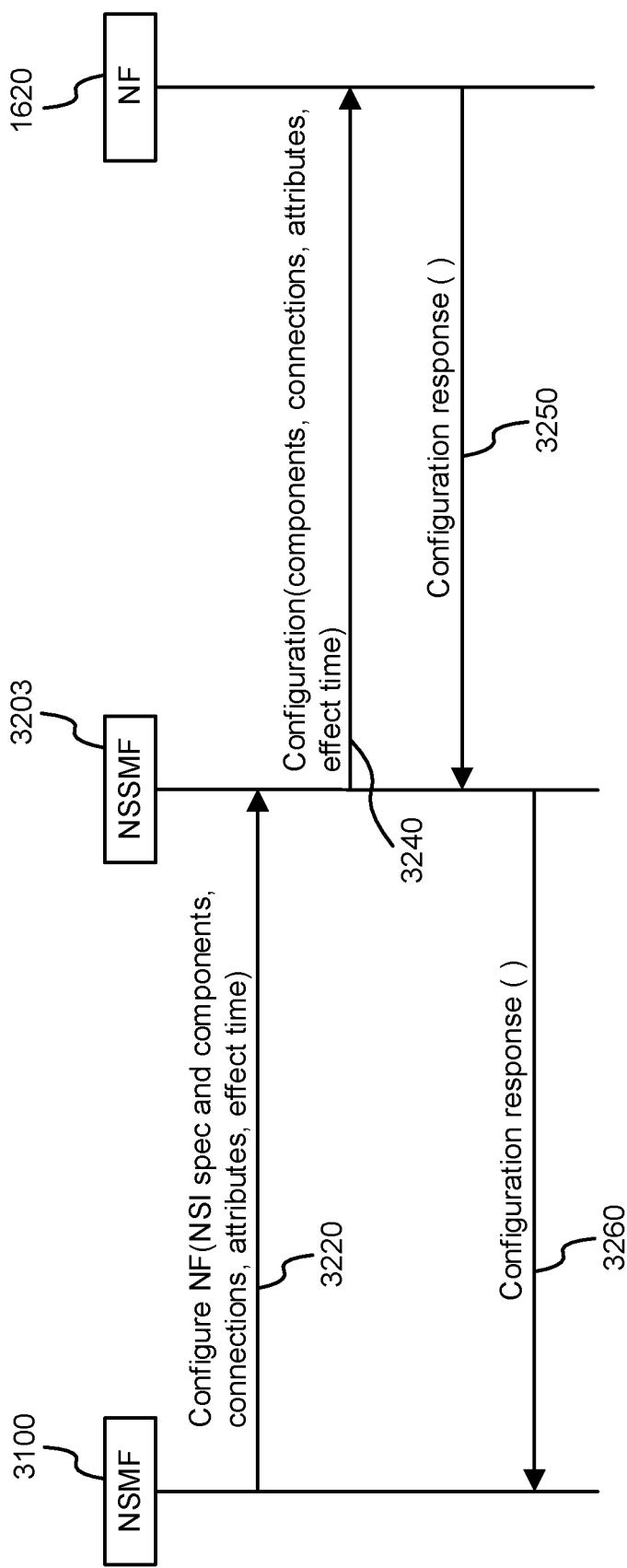
FIG. 32 is a signal flow diagram showing example signal flows for an NSMF to directly configure and/or deploy an NSI specification to an NF in an open NSS according to an example.
Figure 36:
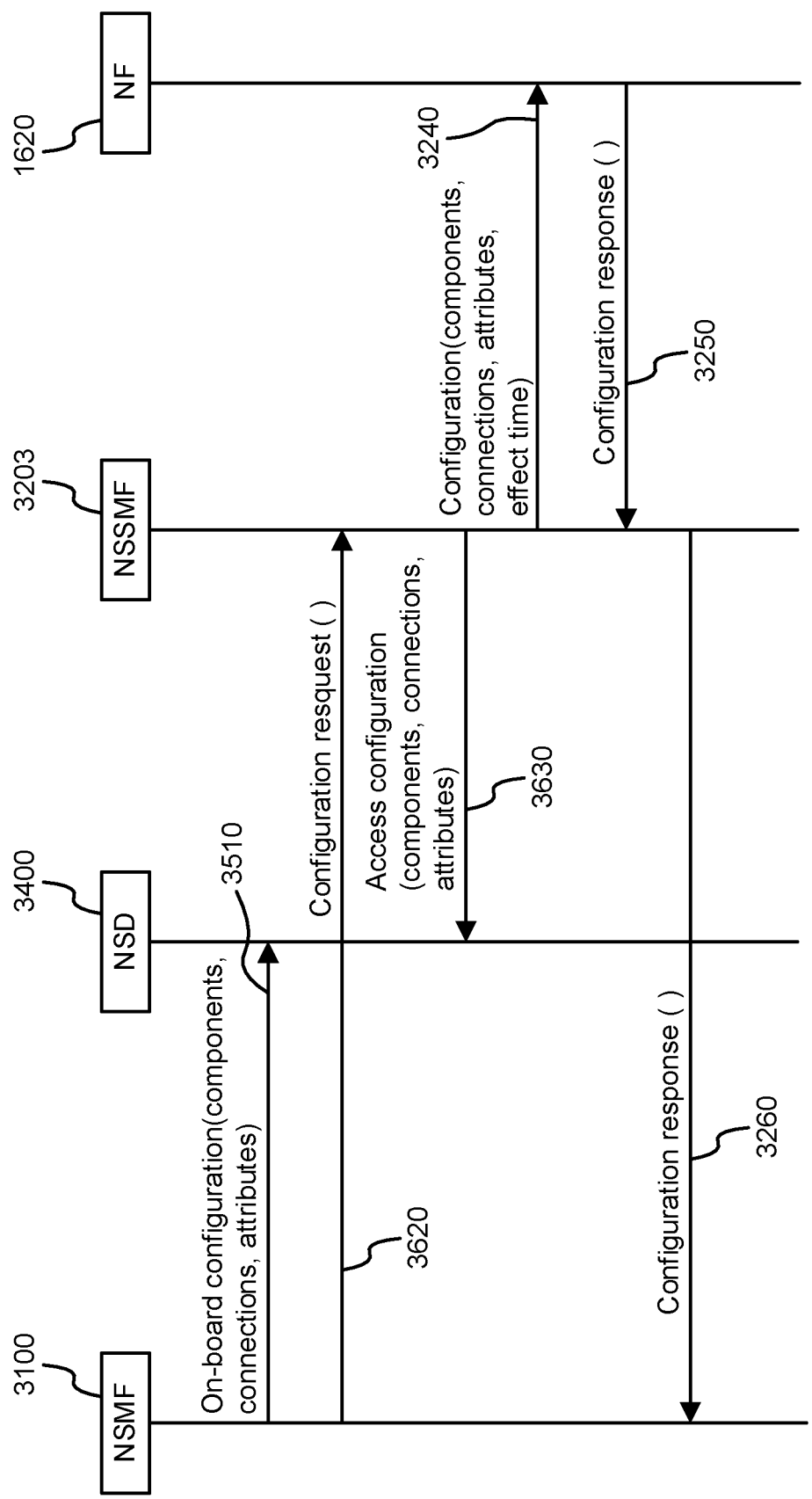
FIG. 36 is a signal flow diagram showing example signal flows for an NSMF to indirectly configure and/or deploy an NSI specification to an NF in an open NSS according to an example.

In FIGS. 32 and 36, the configuration of directly-connected NF(s) 1220 in the NSI 1200 is described. Similarly, in FIGS. 33 and 37, the configuration of NF(s) 1620 in an open NSS 1230 is described.

To the extent that such NF(s) 1220, 1620 (or indeed, NF(s) 1710, 1720 in a closed NSS 1240) relate to a CN CPF 316, the information, in the form of components 1110, connections 1120 thereto and attributes 1130 thereof, may be described in a tabular or other manner, such as shown by non-limiting example in FIG. 19. The indication of whether such CPFs 316 are slice-specific or can be shared may indicate their suitability to be shared by multiple slices. The indication of area may indicate a geographic service area. The indication of services may indicate the service(s) serving traffic. In some examples, the CPFs 316 may not be visible to the specific MSNOC 1810.

Similarly, to the extent that such NF(s) 1220, 1620 (or indeed NF(s) 1710, 1720 in a closed NSS 1240) relate to a CN UPF 86, the information, in the form of components 1110, connections 1120 thereto and attributes 1130 thereof, may be described in a tabular or other manner, such as shown by non-limiting example in FIG. 20.

Further, to the extent that such NF(s) 1220, 1620 (or indeed NF(s) 1710, 1720 in a closed NSS 1240) relate to a (R)AN component, the information, in the form of components 1110, connections 1120 thereto and attributes 1130 thereof, may be described in a tabular or other manner, such as shown by non-limiting example in FIG. 21. The indication of area list may indicate a radio coverage area. The indication of capacity may indicate the coverage, bandwidth and/or latency.

In FIGS. 32 and 36, the configuration of directly-connected NF(s) 1220 in the NSI 1210 is described. Similarly, in FIGS. 34 and 38, the configuration of NF(s) 1710, 1720 in a closed NSS 1240 is described.

To the extent that such NF(s) 1220, 1710, 1720 (or indeed, NF(s) 1620 in an open NSS 1230) relate to a TN component, the information, in the form of components 1110, connections 1120 thereto (in a logical topology) and attributes 1130 thereof, may be described in a tabular or other manner, such as shown by non-limiting example in FIG. 22.

Further, to the extent that such NF(s) 1220, 1710, 1720 (or indeed, NF(s) 1620 in an open NSS 1230) relate to application components such as, without limitation, an AS, the information, in the form of components 1110, connections 1120 thereto and attributes 1130 thereof, may be described in a tabular or other manner, such as shown by non-limiting example in FIG. 23.

Collectively, the example FIGS. 19 through 23 show non-limiting examples of what parameters may be conveyed in FIGS. 32-34 and 36-38 to configure NFs 1220, whether directly-coupled by the NSI 1210 or within an NSS 1230, 1240 and, without limitation, in an example format.

It will be appreciated that the information conveyed in the example FIGS. 19 through 23 may equally be described in a computer language, including without limitation JavaScript object notation (JSON).

Alternatively, the information may be conveyed in Unified Modeling Language (UML), another object-oriented programming language (OOPL), one or more object databases or other computer language or data structure.

FIG. 24 is a schematic diagram of an example NSI 1210, shown generally at 2400, that is loosely-defined. It shows a single MEC 2410, a plurality of CPFs 2420, 2430 and a plurality of UPFs 2440, 2450, 2460, 2470. The MEC 2410 is typically located proximate to the mobile edge of the network. The MEC 2410 is controlled by a CPF 2420 that is downstream from it, as indicated by dashed line 2421.

Each of the UPFs 2440, 2450, 2460, 2470 is located downstream of a CPF 2430 and controlled thereby, as indicated by respective dashed lines 2434, 2435, 2436, 2437.

Dashed line 2432 between CPF 2430 and CPF 2420 represents interaction between these CPFs 2420, 2430 for purposes of location interaction and to facilitate path management.

FIG. 25 shows an example NF attribute description table, shown generally at 2500, that corresponds to the configuration of the example loosely-defined NSI 2400.

An NSI 1210 that includes an NSI topology description in addition to an NSI attribute description is more defined than a loosely-defined NSI 2400. Such NSIs 1210 may be considered to be moderately-defined or fully-defined. In some examples, further gradations of NSIs 1210 may be identified, up to and including a spectrum of NSIs 1210 of which the loosely-defined NSI 2400 and the fully-defined NSI 2900 (FIG. 29) form the opposite extremes and the moderately-defined NSI 2700 (FIG. 27) lies intermediate these two extremes.

The NSI topology description identifies the various NFs 1220 and the logical links coupling pairs of NFs 1220. In some examples, the identification of logical links comprises identification of bi-directional links, which may be expressed in terms of uplink (UL) and downlink (DL) directions relative to an ED 52 of an end-user of the service provided by the network slice specified by the NSI 1210. In some examples, the NSI topology description identifies the capacity of each logical link. In some examples, the NSI topology description identifies the protocol followed by each logical link.

Figure 26:
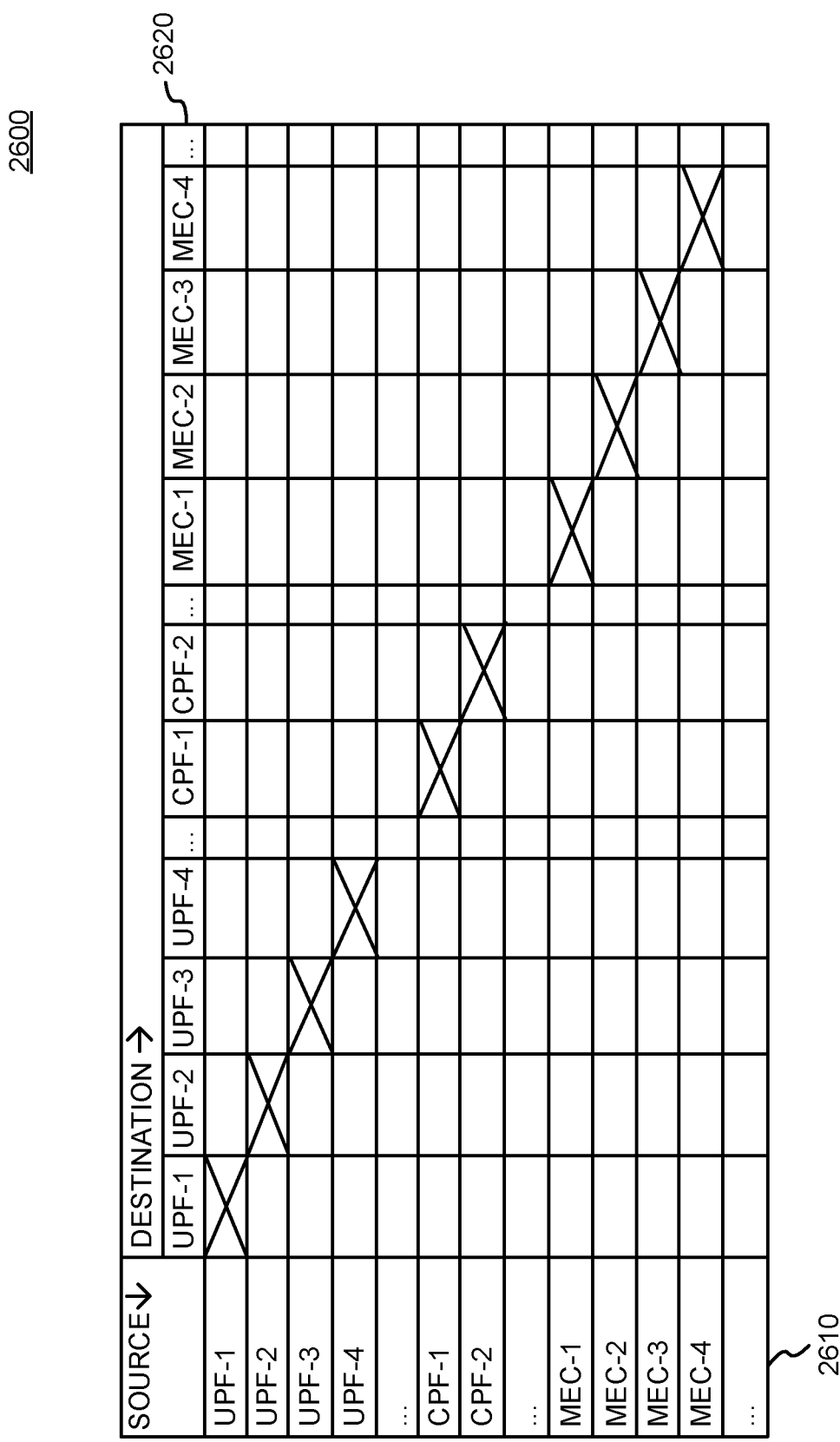
FIG. 26 is an example NSI topology interconnection matrix according to an example.

In some examples, the NSI topology description may be represented by a interconnection matrix such as is shown by FIG. 26. Those having ordinary skill in the relevant art will appreciate that the NF topology description may be represented diagrammatically or otherwise and in manners other than the NF topology interconnection matrix of FIG. 26. By way of non-limiting examples, the NF topology description may comprise a text description, a computer data structure or other suitable description.

In such an NSI topology interconnection matrix, shown generally at 2600, each NF 1220 is identified and listed in successive row headings 2610 and also in successive column headings 2620. One of either the row 2610 or column headings 2620 will be designated as the source of traffic (by way of non-limiting example in the figure, the row headings 2610) and the other of the row 2610 or column headings 2620 (by way of non-limiting example in the figure, the column headings 2620) will be designated as the destination traffic. Thus, entries in cells in the matrix indicate that a logical link couples the NF 1220 identified in the corresponding source row 2610 or column heading 2620 with the NF 1220 identified in the corresponding destination row 2610 or column heading 2620.

For a moderately-defined NSI 2700, the NSI topology description merely identifies the presence or absence of a logical connection coupling two NFs 1220. In the NSI topology interconnection matrix 2600, this may be represented by a binary indicator at the intersection of the source NF row and the destination NF column, for example, "Y". Alternatively, this may be represented by the absence of a binary indicator such as "N", which would otherwise signify the absence of a logical connection coupling the source NF 1220 and the destination NF 1220.

Figure 27:
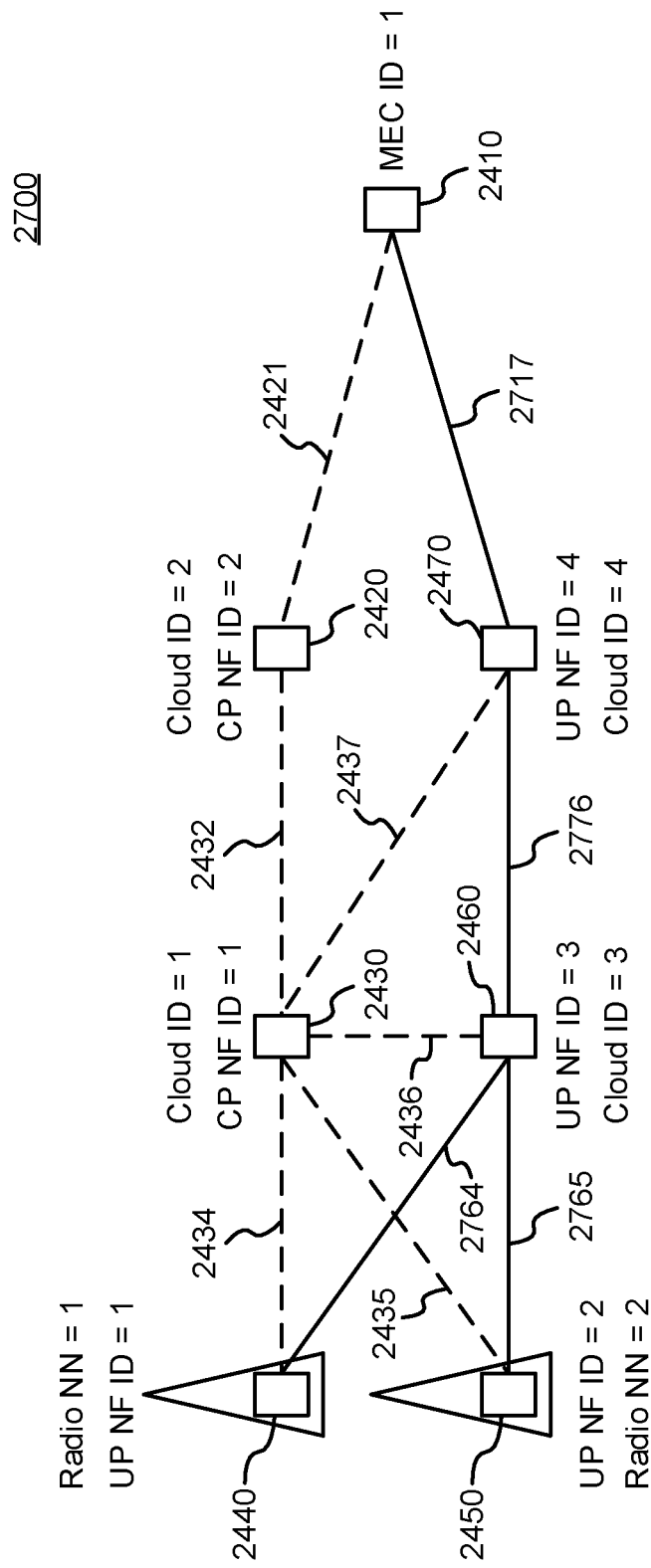
FIG. 27 is a schematic diagram of an example moderately-defined NSI corresponding to the example of FIG. 24.

FIG. 27 is a schematic diagram of an example NSI 1210, shown generally at 2700, that is moderately-defined. It shows the same components as in the loosely-defined NSI 2400 of FIG. 24, namely, by way of non-limiting example, MEC 2410, CPFs 2420, 2430 and UPFs 2440, 2450, 2460, 2470, as well as control links 2421, 2432, 2434, 2435, 2436, 2437. However, in addition to the foregoing, the moderately-defined NSI 2700 comprises logical connections coupling respective pairs of NFs 1220. In particular, by way of non-limiting example, there are shown a logical connection 2717 coupling MEC 2410 and UPF-4 2470, a logical connection 2776 coupling UPF-4 2470 and UPF-3 2460, a logical connection 2764 coupling UPF-3 2460 and UPF-1 2440 and a logical connection 2765 coupling UPF-3 2460 and UPF-2 2450.

The example NF attribute description table 2500 of FIG. 25 also corresponds to the configuration of the example moderately-defined NSI 2700.

FIG. 28 is an example NSI topology interconnection matrix 2600, shown generally at 2800, that corresponds to the configuration of the example moderately-defined NSI 2700. Cells 2811, 2822, 2833, 2844, 2855, 2866, 2877 corresponding to the intersection of a given NF 1220 with itself are denoted by an "X" to represent that there is no logical connection associated therewith.

Both the logical connections 2717, 2776, 2764, 2765 and the control links 2421, 2432, 2434, 2435, 2436, 2437 are represented at the intersection of the respective pairs of NFs 1220 by a "Y" (at cells 2846, 2864, 2856, 2865, 2867, 2876, 2817, 2871). Since such logical connections are considered bi-directional, the "Y" is shown both where the first NF 1220 is considered a source NF 1220 and the second NF 1220 is considered a destination NF (by way of non-limiting example, cell 2846) and where the second NF 1220 is considered a source NF 1220 and the first NF 1220 is considered a destination NF 1220 (by way of corresponding non-limiting example, cell 2864).

By contrast, the control links 2421, 2434, 2435, 2436, 2437 are considered to emanate from the CPF 2420, 2430 so that the "Y" is only shown where the respective CPF 2420, 2430 is considered the source NF 1220 (cells 2834, 2835, 2836, 2837, 2821) and not when the CPF 2420, 2430 is considered the destination NF 1220 (by way of corresponding non-limiting example, cells 2843, 2853, 2863, 2873, 2812). Having said this, it will be appreciated that a CPF 2420, 2430 may control a UPF 2440, 2450, 2460, 2470 or the MEC 2410 and the governing protocol may request a response back therefrom.

With respect to control link 2432, as discussed above, the interaction between these CPFs 2420, 2430 for purposes of location interaction and to facilitate path management, so in the example NSI topology interconnection matrix 2800, the "Y" appears both when CPF-1 2430 is considered the source NF 1220 and CPF-2 2420 is considered the destination NF 1220 (cell 2832) and when CPF-2 2420 is considered the source NF 1220 and CPF-1 2430 is considered the destination NF 1220 (2823).

For a fully-defined NSI 2900, the NSI topology description identifies, in addition to the presence or absence of a logical connection coupling two NFs 1220, as in the moderately-defined NSI 2700, the capabilit(ies) of such logical connection. In the NSI topology interconnection matrix 2600, this may be represented by a capability descriptor at the intersection of the source NF row and the destination NF column, for example, a throughput value.

Figure 29:
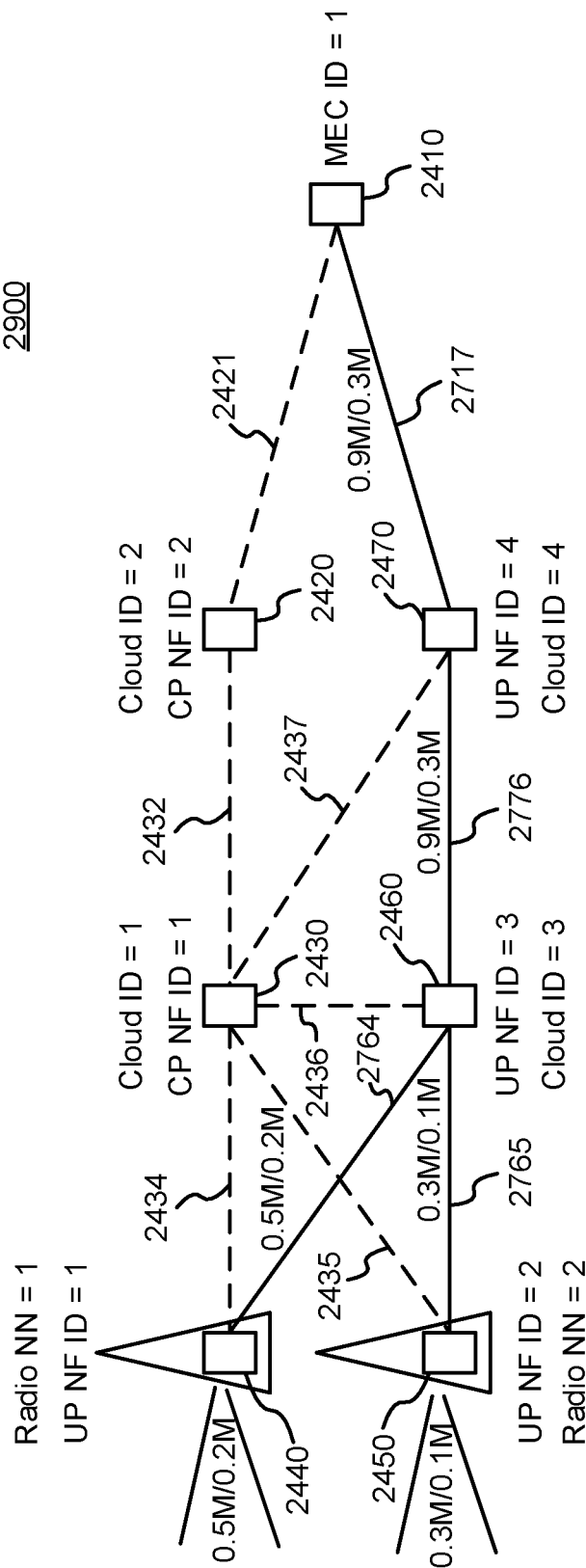
FIG. 29 is a schematic diagram of an example fully-defined NSI corresponding to the example of FIG. 27.

FIG. 29 is a schematic diagram of an example NSI 1210, shown generally at 2900, that is fully-defined. It shows the same components as in the moderately-defined NSI 2700 of FIG. 27, namely, by way of non-limiting example, MEC 2410, CPFs 2420, 2430 and UPFs 2440, 2450, 2460, 2470, as well as control links 2421, 2432, 2434, 2435, 2436, 2437 and logical connections 2714, 2776, 2764, 2765. However, in addition to the foregoing, the fully-defined NSI 2900 comprises an indication of the capability of the logical connections, 2717, 2776, 2764, 2765. In particular, by way of non-limiting example, logical connection 2717 coupling MEC 2410 and UPF-4 2470 is shown to have a UL capacity of 0.9 Mbps and a DL capacity of 0.3 Mbps, logical connection 2776 coupling UPF-4 2470 and UPF-3 2460 is shown to have a UL capacity of 0.9 Mbps and a DL capacity of 0.3 Mbps, logical connection 2764 coupling UPF-3 2460 and UPF-1 2440 is shown to have a UL capacity of 0.5 Mbps and a DL capacity of 0.2 Mbps and logical connection 2765 coupling UPF-3 1260 and UPF-2 1250 is shown to have a UL capacity of 0.3 Mbps and a DL capacity of 0.1 Mbps.

It will be appreciated that the UL capacity, of a logical connection coupling a given NF 1220 as the source NF 1220 to an upstream destination NF 1220, will be greater than or equal to the sum of the UL capacit(ies), of all logical connections coupling the given NF 1220 as the destination NF 1220 to a downstream source NF 1220, in order to support the UL traffic arriving along such downstream logical connections. Thus, for example, the UL capacity of logical connection 2776 exceeds the sum of the UL capacities of logical connections 2764 and 2765. Further, the sum of UL capacit(ies) of logical connections coupling UPF-1 2440 to downstream NF(s) (not shown) will not exceed 0.5 Mbs and the sum of UL capacit(ies) of logical connections coupling UPF-2 2450 to downstream NF(s) (not shown) will not exceed 0.3 Mbps.

Similarly, it will be appreciated that the DL capacity, of a logical connection coupling a given NF 1220 as the destination NF 1220 to an upstream source NF 1220, will be less than or equal to the sum of the DL capacit(ies), of all logical connections coupling the given NF 1220 as the source NF 1220 to a downstream destination NF 1220, in order to support the DL traffic arriving along the upstream logical connection. Thus, for example, the DL capacities of logical connections 2764 and 2765 is at least equal to the DL capacity of logical connection 2776. Further, the sum of DL capacit(ies) of logical connections coupling UPF-1 2440 to downstream NF(s) (not shown) will be greater than or equal to 0.2 Mbps and the sum of DL capacit(ies) of logical connections coupling UPF-2 2450 to downstream NF(s) (not shown) will be greater than or equal to 0.1 Mbps.

The example NF attribute description table 2500 of FIG. 25 also corresponds to the configuration of the example moderately-defined NSI 2700.

FIG. 30 is an example NSI topology interconnection matrix 2600, shown generally at 3000, that corresponds to the configuration of the example fully-defined NSI 2900. It differs from the moderately-defined NSI topology interconnection matrix 2800 in that the cell 3046 corresponding to the intersection of UPF-1 2440 as source NF 1220 and UPF-3 2460 as destination NF 1220 shows an (UL) capacity of 0.5 Mbps, the cell 3056 corresponding to the intersection of UPF-2 2450 as source NF 1220 and UPF-3 2460 as destination NF 1220 shows a (UL) capacity of 0.3 Mbps, the cell 3064 corresponding to the intersection of UPF-3 2460 as source NF 1220 and UPF-1 2440 as destination NF 1220 shows a (DL) capacity of 0.2 Mbps, the cell 3065 corresponding to the intersection of UPF-3 2460 as source NF 1220 and UPF-2 2450 as destination NF 1220 shows a (DL) capacity of 0.1 Mbps, the cell 3067 corresponding to the intersection of UPF-3 2460 as source NF 1220 and UPF-4 2470 as destination NF 1220 shows a (UL) capacity of 0.9 Mbps, the cell 3076 corresponding to the intersection of UPF-4 2470 as source NF 1220 and UPF-3 2460 as destination NF 1220 shows a (UL) capacity of 0.3 Mbps, the cell 3071 corresponding to the intersection of UPF-4 2470 as source NF 1220 and MEC-1 2410 as destination NF 1220 shows a (UL) capacity of 0.9 Mbps and the cell 1817 corresponding to the intersection of MEC-1 2410 as source NF 1220 and UPF-4 2470 as destination NF 1220 shows a (DL) capacity of 0.3 Mbps.

However, the cells 2834, 2835, 2836, 2837, 2821, 2823, 2843, 2853, 2863, 2873, 2832 corresponding to the control links 2421, 2434, 2435, 2436, 2437 remain unchanged in the fully-defined NSI topology interconnection matrix 3000 from the moderately-defined NSI topology interconnection matrix 2800.

In some examples, the NSI specification further encompasses a specification of a closed network sub-slice instance (NSSI) 1240. This is a recognition that some sub-nets of an NSI 1210, including without limitation, non-3GPP compliant components, may closed, or not visible to the NSI 1210. In such circumstances, the specification of a closed NSSI 1240 may provide an abstracted information objective class (IOC) of such NSSI component(s).

In some examples, it will be appreciated that an end-to-end (E2E) NSI 1210 may comprise a plurality of NSI portions, in the form of, without limitation, one or more segments, clusters, subnets, zones and/or domains. It will be appreciated that each such NSI portion may have a NSI portion specification similar in scope to the NSI specification discussed above, that is loosely-defined, moderately-defined, fully-defined and/or a definition that may be intermediate a loosely-defined and a fully-defined specification as discussed previously. In some examples, an E2E NSI specification for an E2E NSI 1210 can comprise a plurality of NSI portion specifications each corresponding to one of the constituent NSI portions.

In order to configure the CPFs 2420, 2430 and/or UPFs 2440, 2450, 2460, 2470 that form all or one or more segments of the NSI specification for operation, the (relevant segment(s) of the) NSI specification is deployed to the relevant CPFs 2420, 2430.

In some examples, the (segment(s) of the) NSI specification may be deployed directly. Such direct deployment is shown in the example signal flow diagram of FIG. 31. The figure shows communications between the NSMF 3100 and the constituent directly-coupled NF(s) 1220, including without limitation, CPFs 2420, 2430 of the NSI 1220 relevant to the NSI 1210 and/or the service(s) thereof being configured.

After the NSI specification has been developed, the NSMF 3100 communicates 3110 to the constituent NF(s) 1220, a configuration request comprising at least one aspect of the (segment of the) NSI specification, components 1110, connections thereto 1120, attributes 1130 thereof and/or any other configuration information, including without limitation a time when the configuration change is to take effect.

When the configuration request 3110 has been received (and/or processed and/or given effect, including without limitation, instantiating, operating and/or managing the NF), the constituent NF(s) send 3120 a configuration response to the NSMF 3100.

In FIG. 32, the direct configuration, by the NSMF 3100 of the NSI 1210, of NF(s) 1620 within an open NSS 1230 is described. This figure shows communication between the NSMF 3100, the NSSMF 3203 of the open NSS 1230 and the NF(s) 1620 of the open NSS 1230 relevant to the NSI 1210 and/or the service(s) thereof being configured.

The NSMF 3100 may provide the NSSMF 3203 sufficient information to allow the NSSMF 3203 to configure the applicable NF(s) 1620 of the NSS 1230. Configuration of these NF(s) 1620 may involve providing service/slice differentiation information that allows the NSSMF 3203 to differentiate the traffic of various services and NSIs 1210 if the NSS 1230 is shared among a plurality of services or NSIs 1210; functionality selection information relating to functionalities of the NFs 1620 (including without limitation an AMF 90) that are called for by the types of service provided by and demands of the NSI 1210; and operation information relating to the operation of the NF 1620, including without limitation a UPF 86 topology for the SMF 92).

After the information model 1200 of the NSI 1210 has been developed, the NSMF 3100 communicates 3320 a configuration request to the NSSMF 3203 of the open NSS 1230. The configuration request 3320 identifies at least one aspect of (segments of the) NSI specification including without limitation, any components 1110, connections 1120 thereto and attributes 1130 thereof and/or any other configuration information including without limitation a time, when the configuration change is to take effect, relevant to the recipient NF(s) 1620 within the open NSS 1230. Typically, there is a single configuration request 3220 to configure all of the recipient NF(s) 1620 within the open NSS 1230.

When the configuration request 3220 has been received (and/or processed and/or given effect, including without limitation, instantiating, operating and/or managing the NF), the NSSMF 3203 sends 3240 a configuration command to each of the relevant NFs 1620 of the open NSS 1230. The configuration command 3240 identifies parameters comprising components 1110, connections 1120 thereto and attributes 1130 thereof relevant to the recipient NF(s) 1620 of the open NSS 1230.

When the configuration command 3240 has been received (and/or processed and/or given effect, including without limitation, instantiating, operating and/or managing the NF), the recipient NF(s) 1620 of the open NSS 1230 send 3250 a configuration response back to the NSSMF 3203.

Figure 34:
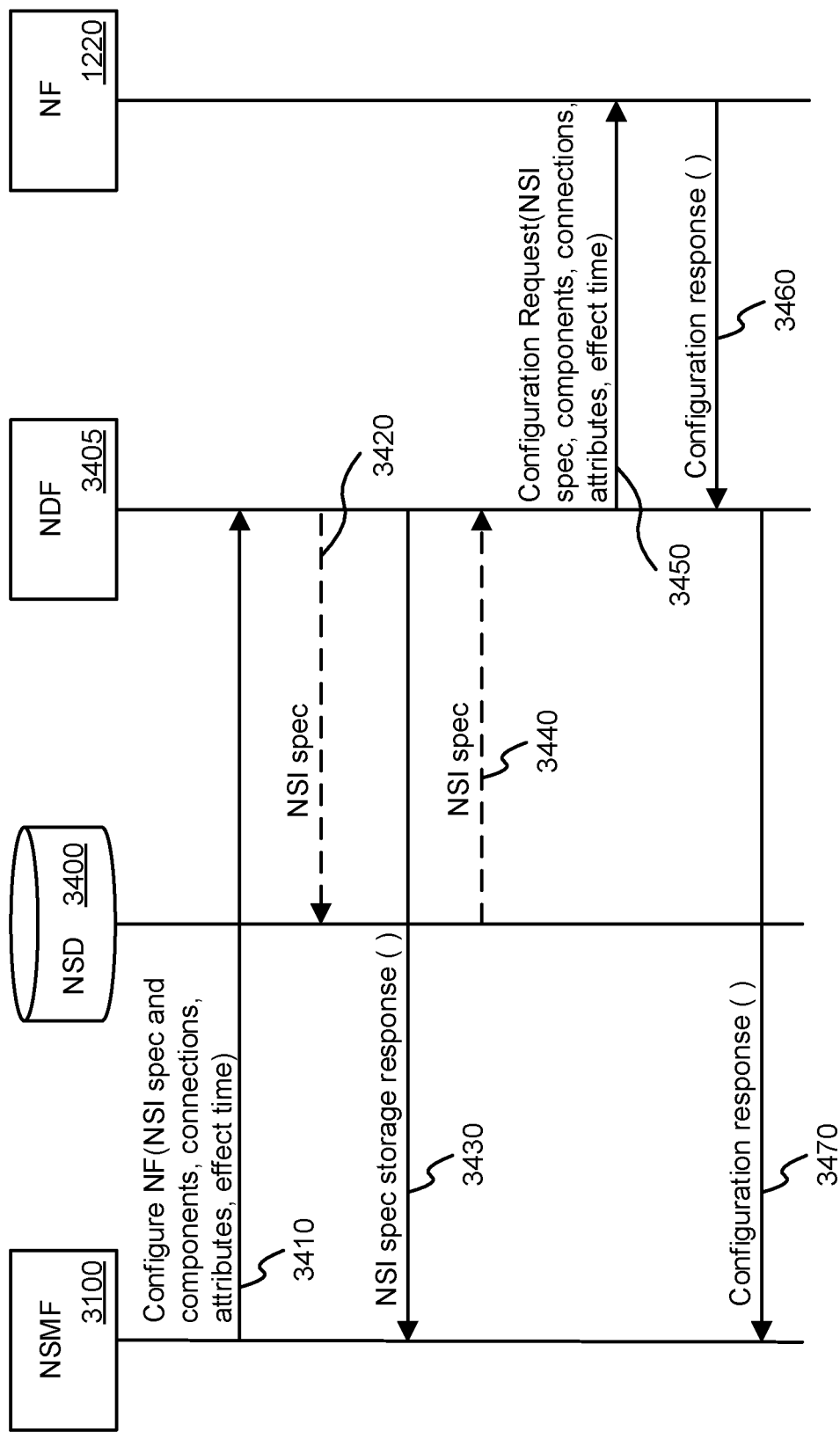
FIG. 34 is a signal flow diagram showing example signal flows for an NSMF to indirectly configure and/or deploy an NSI specification to an NF of the NSI using an NSI specification database and/or an NSI distribution function according to an example.
Figure 35:
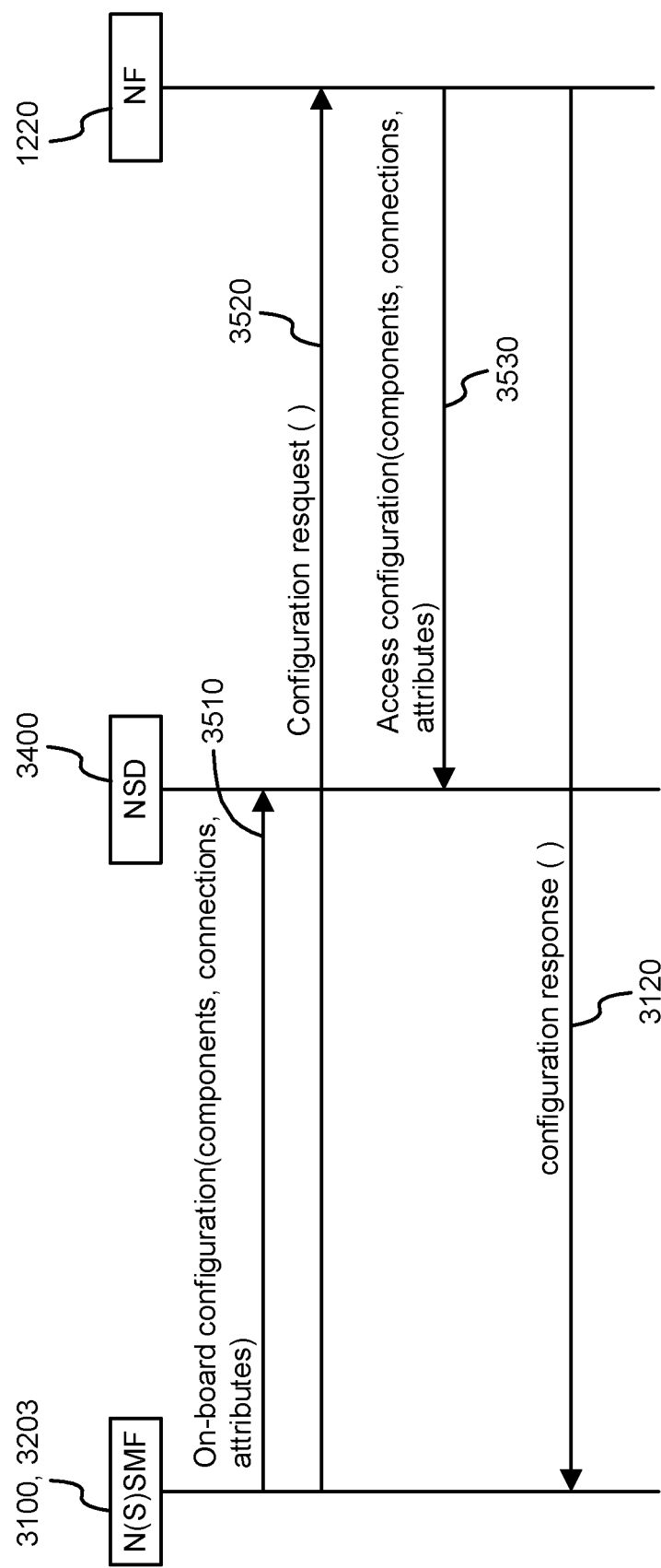
FIG. 35 is a signal flow diagram showing example signal flows for an NSMF to indirectly configure and/or deploy an NSI specification to a directly-coupled NF according to an example.

As indicated above, it will appreciated that the direct configuration by the NSSMF 3203 of the recipient NF(s) 1620 in signal flows 3240, 3250 may be done indirectly using the flows shown in FIG. 35 as between the NSSMF 3203, the recipient NF(s) 1620 and a NSS database (not shown) comparable to the NSD 3400 (FIG. 34).

When the configuration response 3450 has been received (and/or processed and/or given effect), the NSSMF 3203 sends 3260 a configuration response back to the NSMF 3100.

Figure 33:
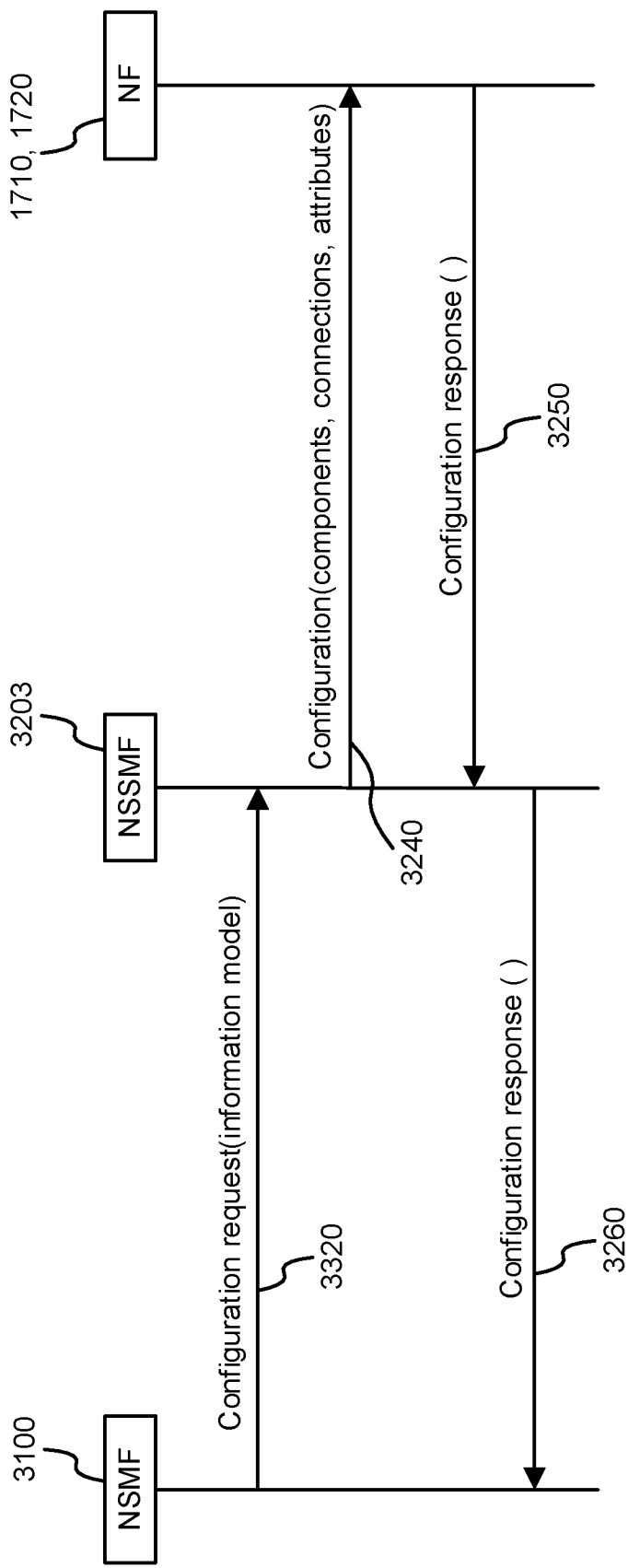
FIG. 33 is a signal flow diagram showing example flows for an NSMF to directly configure and/or deploy an NSI specification to an NF in a closed NSS according to an example.

In FIG. 33, the direct configuration, by the NSF 3100 of the NSI 1210, of NF(s) 1710, 1720 within a closed NSS 1240 is described. This figure shows communication between the NSMF 3100, the NSSMF 3203 of the closed NSS 1240 and the NF(s) 1710, 1720 of the closed NSS 1240 relevant to the NSI 1210 and/or the service(s) thereof being configured.

If the NSS 1240 comprises NFs 1710, 1720 that are not directly-configurable by the NSMF 3100, the NSMF 3100 sends to the NSSMF 3203, related configuration information to the extent possible to allow the NSSMF 3203 to configure the NFs 1710, 1720 in the closed NSS 1240.

After the information model 1200 of the NSI 1210 has been developed, the NSMF 3100 communicates 3320 a configuration request to the NSSMF 3203 of the closed NSS 1240. The configuration request 3320 does not identify parameters comprising components 1110, connections 1120 thereto or attributes 1130 thereof relevant to the recipient NF(s) 1710, 1720 within the closed NSS 1240, because the NSMF 3100 does not have visibility within the closed NSS 1240. Rather, the configuration request 3420 identifies at least one aspect of the information model 1200 of the NSI 1210 so that the NSSMF 3203 can identify the relevant parameters comprising components 1110, connections 1120 thereto or attributes 1130 thereof and/or any other configuration information, including without limitation, a time when the configuration change is to take effect. Because only the information model 1200 is being identified, there is only a single configuration request 3320 to configure all of the recipient NF(s) 1710, 1720 within the closed NSS 1240.

When the configuration request 3320 has been received (and/or processed and/or given effect, including without limitation, instantiating, operating and/or managing the NF), the NSSMF 3203 identifies the parameters comprising components 1110, connections 1120 thereto or attributes 1130 thereof relevant to the recipient NF(s) 1710, 1720 within the closed NSS 1240 and sends 3240 a configuration command to each of the relevant NFs 1710, 1720 of the closed NSS 1240. The configuration command 3240 identifies parameters comprising components 1110, connections 1120 thereto and attributes 1130 thereof relevant to the recipient NF(s) 1710, 1720 of the closed NSS 1240.

When the configuration command 3240 has been received (and/or processed and/or given effect, including without limitation, instantiating, operating and/or managing the NF), the recipient NF(s) 1710, 1720 of the closed NSS 1240 send 3250 a configuration response back to the NSSMF 3203.

As indicated above, it will appreciated that the direct configuration by the NSSMF 3203 of the recipient NF(s) 1710, 1720 in signal flows 3240, 3250 may be done indirectly using the flows shown in FIG. 28 as between the NSSMF 3203, the recipient NF(s) 1710, 1720 and a NSS database (not shown) comparable to the NSD 3400.

When the configuration response 3250 has been received (and/or processed and/or given effect, including without limitation, instantiating, operating and/or managing the NF), the NSSMF 3203 sends 3260 a configuration response back to the NSMF 3100.

In some examples, the at least one aspect of the (segment(s) of the) NSI specification may be deployed indirectly. Such indirect deployment is shown in the example signal flow diagram of FIG. 34. The figure shows communications between the NSMF 3100, the constituent NF(s) 1220, as well as a NSI spec database (NSD) 3400 and a NSI distribution function (NDF) 3405.

After the NSI specification has been developed, the NSMF 3100 communicates 3410 to the NDF 3405 an NSI specification storage request comprising at least one aspect of the relevant (segment of the) NSI specification, including without limitation any components 1110, connections 1120 thereto and attributes 1130 thereof and/or any other configuration information, including without limitation a time when the configuration change is to take effect.

The NDF 3400 thereupon stores 3420 the relevant (segment of the) NSI specification at the NSD 3400.

When the NSI specification storage request 3410 has been received (and/or processed and/or given effect, including without limitation, instantiating, operating and/or managing the NF), the NDF 3405 sends 3430 an NSI specification storage response to the NSMF 3100.

At some point in time, conceivably closer to the time when the configuration change is to take effect, the NDF 3405 retrieves 3440 the relevant (segment of the) NSI specification from the NSD 3400.

The NDF 3405 sends 3450 to the constituent NF(s) 1220, an NSI configuration request comprising the relevant (segment of the) NSI specification and/or any other configuration information, including without limitation a time when the configuration change is to take effect.

When the NSI configuration request 3450 has been received (and/or processed and/or given effect, including without limitation, instantiating, operating and/or managing the NF), the constituent NF(s) 1220 send 3460 an NSI configuration response to the NDF 3405.

When the NSI configuration response 3460 has been received (and/or processed and/or given effect, including without limitation, instantiating, operating and/or managing the NF), the NDF 3405 sends 3470 an NSI configuration response to the NSMF 3100.

In FIG. 35, the indirect configuration of directly-coupled NFs 1220 is described. This figure shows communication between the NSMF 3100, the directly-coupled NFs 1220 relevant to the NSI 1210 and/or the service(s) thereof being configured and an NSI database, which in some non-limiting examples may be the NSD 3400.

After the information model 1200 of the NSI 1210 has been developed, the NSMF 3100 on-boards 3510 or uploads to the NSD 3400 parameters comprising components 1110, connections 1120 and attributes 1130 relevant to the recipient NF(s) 1220.

When the on-board 3510 has completed, at some time thereafter, the NSMF 3100 communicates 3520 a configuration request to the relevant NFs 1220 in the NSI 1210. However, this configuration request 3520 does not contain any parameters, such as components 1110, connections 1120 thereto and attributes 1130 thereof.

Rather, upon receipt of the configuration request 3520, the recipient NF(s) 1220 access 3530 the NSI database 3502 to access and download at least one aspect of the information model 1200 in the form of parameters comprising components 1110, connections 1120 thereto and attributes 1130 thereof relevant to it.

When the access 3530 has been processed (and/or given effect, including without limitation, instantiating, operating and/or managing the NF), the recipient NF(s) 1220 send 3160 a configuration response back to the NSMF 3100.

The foregoing has been described in connection with the NSMF 3100 and the directly-coupled NF(s) 1220 of the NSI 1210. It will be appreciated that similar indirect processing may be effected within an NSS 1230, 1240 by the governing NSSMF 3203 and the relevant NF(s) 1620, 1720 within the NSS 1230, 1240.

When configuring an NSI 1210, the components of NSSes 1230, 1240 that make up the NSI 1210 are also to be configured.

In FIG. 36, the indirect configuration, by the NSMF 3100 of the NSI 1210, of NFs 1620 within an open NSS 1230 is described. This figure shows communication between the NSMF 3100, the NSSMF 3203 of the open NSS 1230 and the NF(s) 1620 of the open NSS 1230 relevant to the NSI 1210 and/or the service(s) thereof being configured and the NSD 3400.

After the information model 1200 of the NSI 1210 has been developed, the NSMF 3100 on-boards 3510 to the NSD 3400, at least one aspect of the information model 1200 in the form of parameters comprising components 1110, connections 1120 thereto and attributes 1130 thereof relevant to the recipient NF(s) 1220 within the open NSS 1230.

When the on-board 3510 has completed, at some time thereafter, the NSMF 3100 communicates 3620 a configuration request to the NSSMF 3203 of the open NSS 1230. However, this configuration request 3620 does not contain any parameters, such as components 1110, connections 1120 thereto and attributes 1130 thereof.

Rather, upon receipt of the configuration request 3520, the NSSMF 3203 of the open NSS 1230 accesses 3630 the NSD 3400 to access and download at least one aspect of the information model 1200 in the form of parameters comprising components 1110, connections 1120 thereto and attributes 1130 thereof relevant to the recipient NF(s) 1620 within the open NSS 1230. Typically, there is a single access 3630 of the parameters comprising components 1110, connections 1120 thereto and attributes 1130 thereof to configure all of the recipient NF(s) 1620 within the open NSS 1230.

When the access 3630 has been processed (and/or given effect, including without limitation, instantiating, operating and/or managing the NF), the NSSMF 3203 of the open NSS 1230 communicates 3240 a configuration command to each of the relevant NFs 1620 of the open NSS 1230. The configuration command 3240 identifies at least one aspect of the information model 1200 in the form of parameters comprising components 1110, connections 1120 thereto and attributes 1130 thereof relevant to the recipient NF(s) 1620 of the open NSS 1230.

When the configuration command 3340 has been received (and/or processed and/or given effect, including without limitation, instantiating, operating and/or managing the NF), the recipient NF(s) 1620 of the open NSS 1230 send 3350 a configuration response back to the NSSMF 3203.

As indicated above, it will appreciated that the direct configuration by the NSSMF 3203 of the recipient NF(s) 1620 in signal flows 3340, 3350 may be done indirectly using the flows shown in FIG. 36 as between the NSSMF 3203, the recipient NF(s) 1620 and a NSS database (not shown) comparable to the NSI database 3602.

When the configuration response 3350 has been received (and/or processed and/or given effect, including without limitation, instantiating, operating and/or managing the NF), the NSSMF 3203 sends 3360 a configuration response back to the NSMF 3100.

Figure 37:
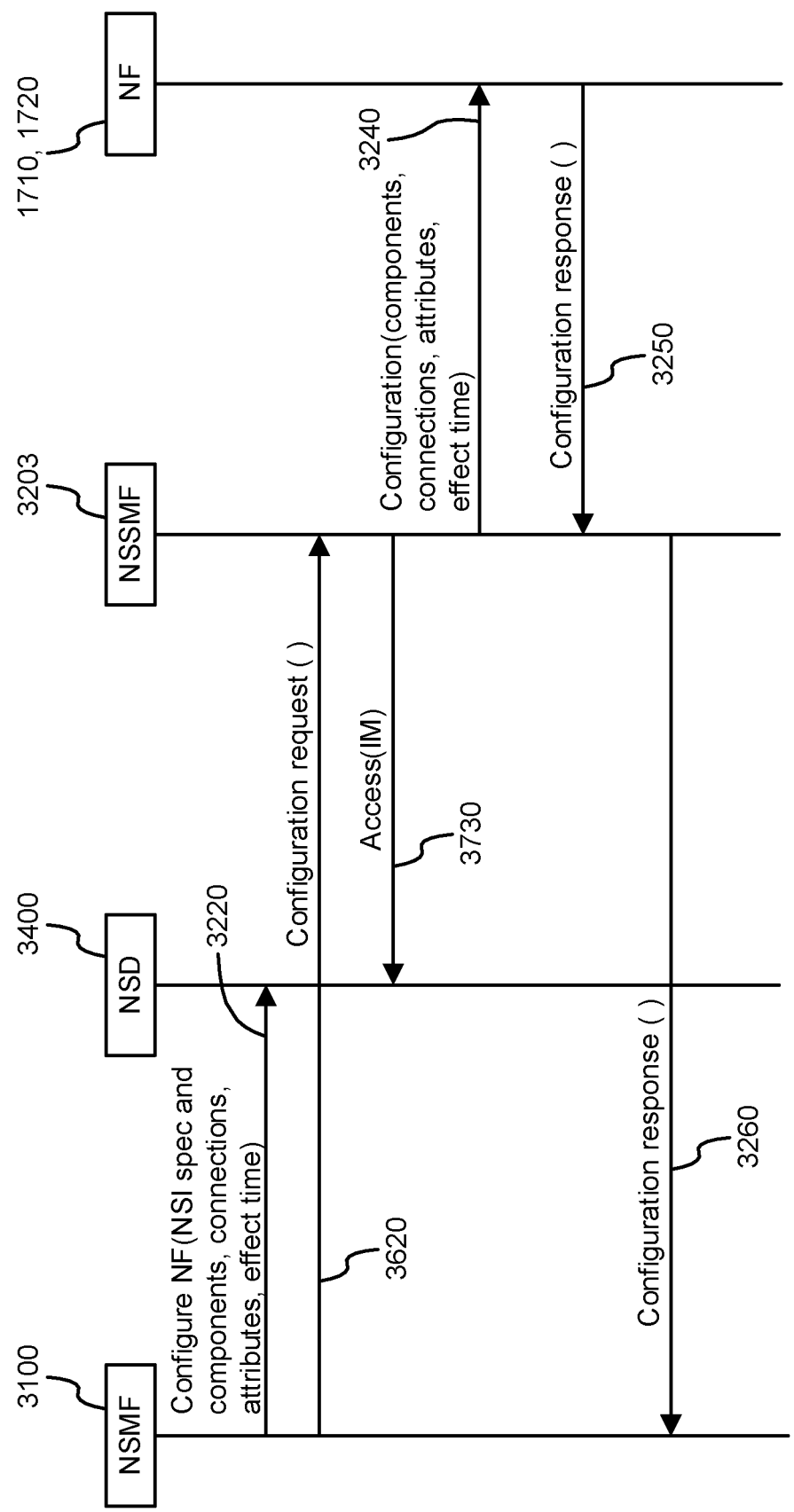
FIG. 37 is a signal flow diagram showing example flows for an NSMF to indirectly configure and/or deploy an NSI specification to an NF in a closed NSS according to an example.

In FIG. 37, the indirect configuration, by the NSMF 3100 of the NSI 1210, of NFs 1710, 1720 within a closed NSS 1240 is described. This figure shows communication between the NSMF 3100, the NSSMF 3203 of the closed NSS 1240 and the NF(s) 1710, 1720 of the closed NSS 1240 relevant to the NSI 1210 and/or the service(s) thereof being configured and the NSI database 2902.

After the information model 1200 of the NSI 1210 has been developed, the NSMF 3100 on-boards 3310 to the NSI database 2902, at least one aspect of the information model 1200 or at least an identifier thereof.

When the on-board 3310 has completed, at some time thereafter, the NSMF 3100 communicates 3720 a configuration request to the NSSMF 3203 of the closed NSS 1240. However, this configuration request 3720 does not contain any parameters, such as components 1110, connections 1120 thereto and attributes 1130 thereof, or even the (identifier of the) information model 1200.

Rather, upon receipt of the configuration request 3620, the NSSMF 3203 of the closed NSS 1240 accesses 3730 the NSD 3400 to access and download at least one aspect of the (identifier of the) information model 1200. Typically, there is a single access 3730 of this information.

With this information, the NSSMF 3203 identifies the parameters comprising components 1110, connections 1120 thereto or attributes 1130 thereof relevant to the recipient NF(s) 1710, 1720 within the closed NSS 1240 and communicates 3240 a configuration command to each of the relevant NFs 1710, 1720 of the closed NSS 1240. The configuration command 3240 identifies parameters comprising components 1110, connections 1120 thereto and attributes 1130 thereof relevant to the recipient NF(s) 1710, 1720 of the closed NSS 1240.

When the configuration command 3240 has been received (and/or processed and/or given effect, including without limitation, instantiating, operating and/or managing the NF), the recipient NF(s) 1710, 1720 of the closed NSS 1240 send 3450 a configuration response back to the NSSMF 3203.

As indicated above, it will appreciated that the direct configuration by the NSSMF 3203 of the recipient NF(s) 1710, 1720 in signal flows 3240, 3250 may be done indirectly using the flows shown in FIG. 35 as between the NSSMF 3203, the recipient NF(s) 1710, 1720 and a NSS database (not shown) comparable to the NSD 3400.

When the configuration response 3250 has been received (and/or processed and/or given effect), the NSSMF 3203 sends 3260 a configuration response back to the NSMF 3100.

Method Actions

Figure 38:
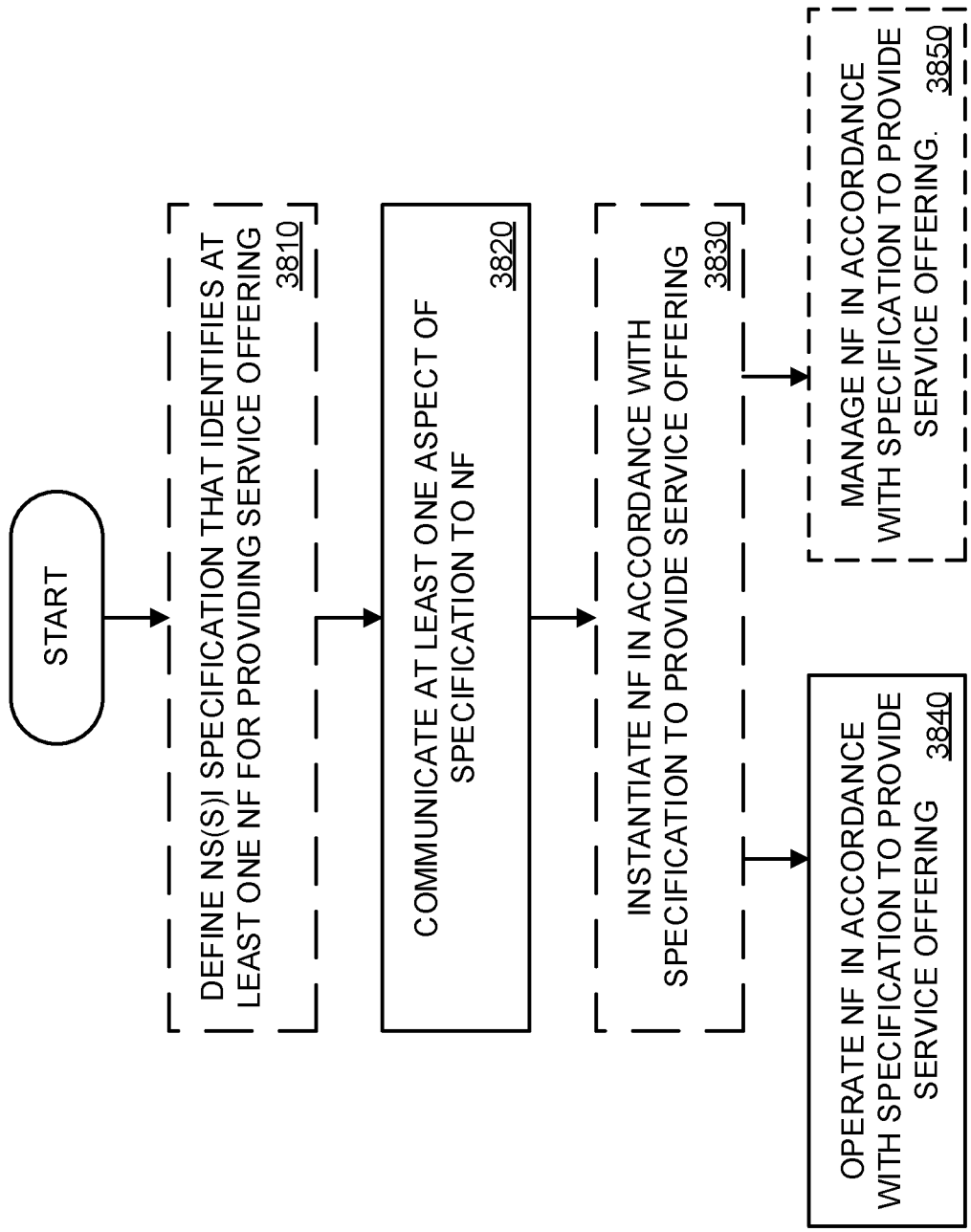
FIG. 38 is a flow chart illustrating an example of a method for configuring an NSI.

Turning now to FIG. 38, there is shown a flow chart, shown generally at 3800, of example actions taken at an MF such as the NSMF 3100 and/or the NSSMF 3203 to provide a service offering to a customer in a communications network comprising a plurality of NFs 1210.

One example action 3810 may be to define a specification of at least one of an NSI 1210 and an NSSI 1230, 1240 that identifies at least one of the NFs 1210 in the network for providing the service offering.

One example action 3820 is to communicate at least one aspect of the specification to the identified at least one NF 1210.

One example action 3830 may be to instantiate the identified at least one NF 1210 in accordance with the specification to provide the service offering to the customer.

In some examples, one example action 3840 is be to operate the identified at least one NF 1210 in accordance with the specification to provide the service offering to the customer.

In some examples, one example action 3850 may be to manage the identified at least one NF 1210 in accordance with the specification to provide the service offering to the customer.

According to a first broad aspect of the present disclosure, there is disclosed an NSI specification comprising a NF attribute description that identifies at least one NF to be deployed in the network slice and describes at least one attribute thereof, selected from a group consisting of an NF type, a function provided by the NF, a location of the NF, at least one capability of the NF and any combination of these.

In an embodiment, the at least one NF can be described by an identifier comprising components selected from a group consisting of an alphabetic identifier, a numeric identifier, an alpha-numeric identifier, the NF type, an NF type identifier and any combination of any of these. In an embodiment, the NF type can be selected from a group consisting of a UPF, a CPF, an AF, a MEC function and any combination of any of these. In an embodiment, the UPF can serve a function selected from a group consisting of an aggregator, a packet dispenser, a point-to-point virtual router, a point-to-multipoint virtual router, a mobility anchor, a GW and any combination of any of these. In an embodiment, the CPF can serve a function selected from a group consisting of an end-to-end SMF, location tracing, resolution management, an AMF, an AUSF, a NEF, an NRF, a PCF, a UDM function, an AF and any combination of any of these.

In an embodiment, the location of the NF can be selected from a group consisting of a physical location, a PoP on which the NF is to be instantiated, a radio NN associated with the NF, an IP address, a cloud address, a tracking area of a radio NN, a cluster of a RAN, a zone of a network, a relative location and any combination of any of these.

In an embodiment, the capability of the NF can be a processing capability of the NF.

In an embodiment, the NF attribute description can be represented in a form selected from a table, a text description, a computer data structure and any combination of any of these.

In an embodiment, the NSI described thereby can be selected from a group consisting of loosely-defined, moderately-defined, fully-defined, a definition intermediate between a loosely-defined and a fully-defined NSI and any combination of any of these. In an embodiment, the NSI specification can further comprise, in respect of an NSI other than a loosely-defined NSI, an NSI topology description that identifies a plurality of the NFs identified in the NF attribute description and an existence of at least one link coupling two of the NFs identified. In an embodiment, a first one of the NFs can be a CPF coupled to a second one of the NFs and the link can be a control link by which the CPF controls the second NF. In an embodiment, the at least one link can be a logical link coupling two NFs. In an embodiment, the NSI topology description can identify an UL direction and a DL direction of the logical link. In an embodiment, the NSI can be a fully-defined NSI and the NSI topology description can identify a capacity of the logical link.

In an embodiment, the capability of the NSI topology description can be represented in a form selected from a table, a text description, a computer data structure and any combination of any of these.

According to a second broad aspect of the present disclosure, there is disclosed an end-to-end (E2E) NSI specification for an E2E NSI, the E2E NSI comprising a plurality of NSI portions each having at least one NF to be deployed in the corresponding network slice of the portion, the E2E NSI specification comprising a plurality of NSI portion specifications each corresponding to one of the NSI portions, each NSI portion specification comprising an NF attribute description that identifies at least one NF to be deployed in the network slice of the portion and describes at least one attribute thereof, selected from a group consisting of an NF type, a function provided by the NF, a location of the NF, at least one capability of the NF and any combination of any of these.

According to a third broad aspect of the present disclosure, there is disclosed a method of configuring an NSE comprising actions, at an NSDF, of: developing an NSI specification comprising an NF attribute description that identifies at least one NF to be deployed in the network slice and describes at least one attribute thereof, selected from a group consisting of an NF type, a function provided by the NF, a location of the NF, at least one capability of the NF and any combination of any of these; and communicating the NSI specification to at least one of the NFs identified in the NSI description that is a CPF for configuring the NFs identified in the NSI description in accordance therewith.

In an embodiment, the action of developing can comprise generating, in addition to the NF attribute description, an NSI topology description that identifies a plurality of the NFs identified in the NF attribute description and an existence of at least one link coupling two of the NFs identified.

In an embodiment, the action of communicating can comprise directly communicating the NSI specification to the CPF. In an embodiment, the action of directly communicating can comprise sending an NSI configuration request comprising the NSI specification to the CPF. In an embodiment, the action of directly communicating can comprise receiving an NSI configuration response from the CPF.

In an embodiment, the action of communicating can comprise indirectly communicating the NSI specification to the CPF. In an embodiment, the action of indirectly communicating can comprise sending a storage request comprising the NSI specification to an NDF. In an embodiment, the storage request can comprise a time when the NFD is to communicate the NSI specification to the CPF. In an embodiment, the action of indirectly communicating can further comprise receiving a storage response from the NDF indicating that the NDF has stored the NSI specification in an NSI specification database. In an embodiment, the NDF can access the NSI specification from the NSI specification database and can communicate the NSI specification to the CPF when the time when the NDF is to communicate the NSI specification occurs. In an embodiment, the action of indirectly communicating can comprise receiving an NSI configuration response from the NDF when the NDF has received an NSI configuration response from the CPF.

According to a first broad aspect of the present disclosure, there is disclosed an information model describing an NSI having at least one NF, the information model being specified by an NSMF from a combination of elements selected from a group consisting of at least one component of the NSI, at least one connection coupling components of the NSI, at least one attribute of the at least one component and any combaination of any of these.

In an embodiment, the at least one component can be selected from an NF, an NSS having at least one NF and any combination of any of these. In an embodiment, the NF can be directly-coupled within the NSI. In an embodiment, the NSS can be specified by an NSSMF from a combination of elements selected from a group consisting of at least one NF of the NSS, at least one connection coupling NFs of the NSS, at least one attribute of the at least one NF of the NSS and any combination of any of these. In an embodiment, the at least one NF of the NSS can be selected from a group consisting of a CPF, a UPF, a TN function and any combination of any of these.

In an embodiment, the NSS can be visible to the NSMF. In an embodiment, the NSS can be a 3GPP NSS. In an embodiment, the NSS may not be visible to the NSMF and the NSMF can be provided with an IOC describing an abstraction thereof. In an embodiment, the NSS can be a non-3GPP NSS.

In an embodiment, the at least one connection can provide information about the topology of the components of the NSI. In an embodiment, the information about the topology can be selected from a group consisting of a physical location, a PoP on which the NF is to be instantiated, a radio NN associated with the NF, an IP address, a cloud address, a tracking area of a radio NN, a cluster of a RAN, a zone of a network, a relative location and any combination of any of these. In an embodiment, the information about the topology can relate to the topology of a NSS that is a component of the NSI. In an embodiment, the at least one connection can identify connectivity of a NSS that is a component of the NSI.

In an embodiment, the at least one connection can identify at least one SFC coupling a plurality of the NFs. In an embodiment, the at least one SFC can couple NFs that are directly-coupled within the NSI. In an embodiment, the at least one SFC can couple NFs of an NSS that is a component of the NSI.

In an embodiment, the at least one attribute can be selected from a group consisting of a slice-level policy, service information, a network slice specification, other slice-level attributes and any combination of any of these. In an embodiment, the at least one attribute can identify an attribute of an NSS that is a component of the NSI. In an embodiment, the attribute of an NSS can be selected from a group consisting of a function-level policy of a CPF, a function-level attribute of a CPF, a function-level policy of a UPF, a function-level attribute of a UPF, information of a TN function, a policy of a TN function and any combination of any of these.

According to a second broad aspect of the present disclosure, there is disclosed a method of configuring a NSI comprising actions, at an NSMF, of: specifying an information model describing the NSI having at least one NF, from a combination of elements selected from a group consisting of at least one component of the NSI, at least one connection coupling components of the NSI, at least one attribute of the at least one component and any combination of any of these; and communicating parameters comprising at least one of the components, connections thereto and attributes thereof to an NF identified in the information model in accordance therewith.

In an embodiment, the action of communicating can comprise directly communicating the parameters to the NF. In an embodiment, the action of directly communicating can comprise sending a configuration request comprising the parameters to the NF. In an embodiment, the action of directly communicating can comprise receiving a configuration response from the NF.

In an embodiment, the action of communicating can comprise indirectly communicating the parameters to the NF. In an embodiment, the action of indirectly communicating the parameters to the NF can comprise on-boarding the parameters to a database so that the NF can access the on-boarded parameters from the database. In an embodiment, the action of indirectly communicating the parameters to the NF can comprise communicating the parameters to an NSSMF associated with an NSS, visible to the NSMF, that comprises the NF so that the NSSMF can communicate the parameters to the NF. In an embodiment, the action of communicating the parameters to the NSSMF can comprise sending a configuration request comprising the parameters to the NSSMF. In an embodiment, the action of communicating the parameters to the NSSMF can comprise receiving a configuration response from the NSSMF. The action of communicating the parameters to the NSSMF can comprise on-boarding the parameters to a database so that the NSSMF can access the on-boarded parameters from the database. In an embodiment, the NSSMF can communicate the parameters to the NF by sending a configuration message comprising the parameters to the NF. In an embodiment, the NSSMF can communicate the parameters to the NF by receiving a configuration response from the NF. In an embodiment, the NSSMF can communicate the parameters to the NF by on-boarding the parameters to a database and the NF can access the on-boarded parameters from the database.

In an embodiment, the action of indirectly communicating the parameters to the NF can comprise communicating the information model to an NSSMF associated with an NSS, not visible to the NSMF, that comprises the NF so that the NSSMF can derive the parameters from the information model and communicate them to the NF. In an embodiment, the action of communicating the information model to the NSSMF can comprise sending a configuration request comprising the information model to the NSSMF. In an embodiment, the action of communicating the information model to the NSSMF can comprise receiving a configuration response from the NSSMF. In an embodiment, the action of communicating the information model to the NSSMF can comprise on-boarding the information model to a database so that the NSSMF can access the on-boarded information model from the database. In an embodiment, the NSSMF can communicate the parameters to the NF by sending a configuring message comprising the parameters to the NF. In an embodiment, the NSSMF can communicate the parameters to the NF by receiving a configuration response from the NF. In an embodiment, the NSSMF can communicate the parameters to the NF by on-boarding the parameters to a database so that the NF can access the on-boarded parameters from the database.

Embodiments have been described above in conjunction with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether optically, electrically, mechanically, chemically, or otherwise.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which can be modified by omitting, adding or replacing elements with equivalent functional elements, provides many applicable inventive concepts that may be embodied in a wide variety of specific contexts. The specific embodiments discussed are merely illustrative of specific ways to make and use the concepts disclosed herein, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims:

What is claimed is:

1. A function in a communications network, comprising:
a processor; and
a non-transitory memory for storing instructions that when executed by the processor, cause the function to:
communicate a specification of a network slice instance (NSI) that describes the NSI, wherein the specification comprises information that specifies at least one of a plurality of network functions (NFs) of the NSI, an attribute of each NF of the NSI, and a topology of the NSI, the topology of the NSI designating traffic sources and traffic destinations of a plurality of links between the plurality of network functions; and
operate the plurality of NFs in accordance with the specification.

2. The function according to claim 1, wherein the function is a management function (MF) or a network slice MF (NSMF).

3. The function according to claim 1, wherein the specification includes a specification of a network slice subnet instance (NSSI) and the function is a management function (MF) or a network slice subnet MF (NSSMF).

4. The function according to claim 1, wherein the instructions cause the function to develop an information model describing the NSI with the specification.

5. The function according to claim 1, wherein the information further specifies connectivity of an NSSI that is a component of the NSI, and at least one service function chain (SFC) coupling a plurality of the NFs.

6. The function according to claim 1, wherein the instructions further cause the function to obtain the specification of the NSI in at least one of following solutions: a loosely-defined solution, a moderately-defined solution, and a fully-defined solution.

7. The function according to claim 6, wherein, in respect of a specification that is other than the loosely-defined solution, the specification comprises the information that specifies the plurality of the NFs of the NSI and the topology of the NSI that identifies an existence of at least one link coupling two of the plurality of NFs.

8. The function according to claim 7, wherein one NF associated with the at least one link is a control plane function (CPF) and the at least one link couples the CPF to a second one of the plurality of NFs controlled by the CPF.

9. The function according to claim 7, wherein the at least one link is a logical link coupling the two of the plurality of the NFs.

10. The function according to claim 9, wherein the information that specifies the topology of the NSI identifies an uplink (UL) direction and a downlink (DL) direction of the logical link.

11. The function according to claim 9, wherein the instance is the fully-defined solution and the information that specifies the topology description of the NSI further identifies a capacity of the logical link.

12. The function according to claim 1, wherein the specification is communicated to at least one of the NFs of the NSI that is a control plane function (CPF).

13. The function according to claim 1, wherein the instructions cause the function to communicate by one of sending and receiving a NSI configuration request message comprising the specification.

14. The function according to claim 1, wherein the instructions further cause the function to communicate by sending a storage request including the specification to a database and informing at least one of the NFs to access the database to obtain the specification.

15. The function according to claim 1, wherein the instructions further cause the function to communicate by sending a storage request including the at least one aspect of the specification to a NSI specification database and informing a NSI specification database distribution function to access the NSI specification database and communicate the at least one aspect of the specification to at least one of the NFs.

16. The function according to claim 1, wherein the function is one of the NFs that the information included in the specification of the NSI specifies.

17. The function according to claim 1, wherein the instructions further cause the function to execute at least one of instantiating, managing and controlling at least one of the plurality of NFs in accordance with at least one aspect of the specification of the NSI.

18. The function according to claim 1, wherein the instructions further cause the function to communicate by obtaining a notification to access a database and obtaining at least one aspect of the specification from the database.

19. The function of claim 1 wherein the NSI is associated with one or more segments of the network where an end-to-end (E2E) network slice crosses.

20. The function of claim 19 wherein the NSI is configured based on the specification with one of fully defined, moderately defined and loosely defined solutions, and the NSI is configured differently from another NSI associated with different segments of the network.

21. A method comprising:
communicating a specification of a network slice instance (NSI) that describes the NSI, wherein the specification comprises information that specifies at least one of a plurality of network functions (NFs) of the NSI, an attribute of each NF of the NSI, and a topology of the NSI, the topology of the NSI designating traffic sources and traffic destinations of a plurality of links between the plurality of network functions; and
operating the plurality of NFs in accordance with the specification.

22. A system comprising a first function, a second function and a network interface communicatively coupling the first function with the second function, wherein the first function is configured to:
communicate a specification of a network slice instance (NSI) that describes the NSI with the second function via the network function, wherein the specification comprises information that specifies at least one of a plurality of network functions (NFs) of the NSI, an attribute of each NF of the NSI, and a topology of the NSI, the topology of the NSI designating traffic sources and traffic destinations of a plurality of links between the plurality of network functions; and
the first function is further configured to:
operate the plurality of NFs in accordance with the specification.

* * * * *